US010025135B2

(12) United States Patent
Wakabayashi

(10) Patent No.: US 10,025,135 B2
(45) Date of Patent: Jul. 17, 2018

(54) LENS ARRAY SUBSTRATE, OPTOELECTRONIC DEVICE, AND ELECTRONIC APPARATUS

(71) Applicant: Seiko Epson Corporation, Tokyo (JP)

(72) Inventor: Junichi Wakabayashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 263 days.

(21) Appl. No.: 14/715,760

(22) Filed: May 19, 2015

(65) Prior Publication Data

US 2015/0346547 A1    Dec. 3, 2015

(30) Foreign Application Priority Data

May 28, 2014  (JP) ................................ 2014-109852

(51) Int. Cl.
*G02F 1/1335* (2006.01)
*G02B 3/00* (2006.01)
*G02B 27/02* (2006.01)

(52) U.S. Cl.
CPC ..... *G02F 1/133526* (2013.01); *G02B 3/0068* (2013.01); *G02F 1/133512* (2013.01); *G02B 3/0056* (2013.01); *G02B 27/026* (2013.01); *G02F 1/133504* (2013.01); *G02F 2001/133507* (2013.01)

(58) Field of Classification Search
CPC combination set(s) only.
See application file for complete search history.

(56) References Cited

U.S. PATENT DOCUMENTS

| 4,859,027 A * | 8/1989 | Kishida ................ G03B 21/625 |
| | | 359/455 |
| 6,373,634 B1 | 4/2002 | Nishikawa |
| 2002/0027715 A1 | 3/2002 | Shimizu et al. |
| 2004/0100700 A1* | 5/2004 | Kitamura ......... B29D 11/00278 |
| | | 359/622 |
| 2006/0195293 A1 | 2/2006 | Koike et al. |
| 2006/0046486 A1 | 3/2006 | Ozawa |
| 2007/0247731 A1 | 10/2007 | Mizusako |

(Continued)

FOREIGN PATENT DOCUMENTS

| JP | 2000-131505 A | 5/2000 |
| JP | 2000-305472 A | 11/2000 |
| JP | 2002-006114 A | 1/2002 |

(Continued)

*Primary Examiner* — Wen-Ying P Chen
(74) *Attorney, Agent, or Firm* — ALG Intellectual Property, LLC

(57) ABSTRACT

A microlens array substrate includes a substrate, a first microlens that is disposed on a face of the substrate, a first light-transmissive layer that is disposed to cover the first microlens, a second microlens that is disposed on the intermediate layer and is arranged to overlap with the first microlens in a planar view, and a second light-transmissive layer that is disposed to cover the second microlens. A first flat portion is disposed between the first microlenses that neighbor each other at a vertex. A second flat portion is disposed between the second microlenses that neighbor each other at a vertex. The first flat portion and the second flat portion are arranged in order for at least a part of the first flat portion and a part of the second flat portion to overlap with each other in a planar view.

13 Claims, 17 Drawing Sheets

(56) References Cited

U.S. PATENT DOCUMENTS

2009/0257000 A1    10/2009  Ogasawara et al.
2011/0109818 A1*    5/2011  Uneda ............... G02F 1/133526
                                                         349/5

FOREIGN PATENT DOCUMENTS

| JP | 2002-014205 A | 1/2002 |
| JP | 2002-286910 A | 10/2002 |
| JP | 2006-071941 A | 3/2006 |
| JP | 2006-235415 A | 9/2006 |
| JP | 2007-256593 A | 10/2007 |
| JP | 2009-258298 A | 11/2009 |
| JP | 2011-059230 A | 3/2011 |
| JP | 2014-089230 A | 5/2014 |

* cited by examiner

RELATED ART

LENS ARRAY SUBSTRATE, OPTOELECTRONIC DEVICE, AND ELECTRONIC APPARATUS

BACKGROUND

1. Technical Field

The present invention relates to a lens array substrate, an optoelectronic device, and an electronic apparatus.

2. Related Art

There is known an optoelectronic device that is provided with an optoelectronic material such as a liquid crystal between an element substrate and an opposite substrate. Examples of an optoelectronic device include a liquid crystal device used as a liquid crystal light valve of a projector and an imaging device used as an imaging unit of a video camera. In a liquid device, a light-blocking portion is disposed in an area where a switching element, wiring, and the like are arranged, and a part of incident light is blocked by the light-blocking portion and is not used. From this point, there is known a configuration that is intended to improve the efficiency of use of light in the liquid crystal device by providing a microlens in at least one of the substrates, condensing light that is a part of light being incident on the liquid crystal device and is blocked by the light-blocking portion arranged at the boundary between pixels, and allowing condensed light to be incident into an opening portion of a pixel (for example, refer to JP-A-2014-089230).

The microlens with which the liquid crystal device disclosed in JP-A-2014-089230 is provided includes a first lens and a second lens. The first lens is on the incidence side of the liquid crystal device and is configured by filling a concave portion formed in the substrate with an inorganic material having a higher refractive index than the substrate. The second lens is formed into a convex shape on the first lens with an inorganic layer (optical path length adjusting layer) interposed therebetween. The cross-sectional shape of the first lens and the second lens is substantially hemispheric. The planar shape of the first lens and the second lens is rectangular or substantially circular. Neighboring lenses may be formed independently.

Incidentally, in the liquid crystal device provided with the two-stage microlens as disclosed in JPA-2014-089230, when, for example, neighboring first lenses are formed independently, between the neighboring first lenses is a flat surface that is substantially parallel to the upper surface of the substrate. When neighboring second lenses are connected to each other, light that is incident on the flat surface between the neighboring first lenses travels without being refracted in the first lens and is incident on an end portion of the second lens. The angle between the upper surface of the substrate and the curved surface of the lens is large in the end portion of the second lens of which the cross-sectional shape is substantially hemispheric. Thus, when light is incident on the upper surface of the substrate to the end portion of the second lens in a substantially vertical direction, the light is totally reflected in the second lens to travel in an inclined direction or is scattered, thus causing stray light. When such stray light occurs, this may cause the contrast of the liquid crystal device to be degraded or cause degradation of display quality such as flickering and crosstalk due to an increase in an optical leakage current in a TFT. In addition, even in a case where the imaging device is provided with the two-stage microlens, when stray light occurs as described above, this may cause the S/N ratio and the resolution of gradations in a captured image to be degraded.

SUMMARY

The invention can be realized in the following forms or application examples.

Application Example 1

According to this application example, there is provided a lens array substrate including a substrate, a plurality of first lenses that is disposed on a first face of the substrate and each has a planar shape of a substantial polygon, a first light-transmissive layer that is disposed to cover the plurality of first lenses, a plurality of second lenses that is disposed on the intermediate layer and each has a planar shape of a substantial polygon, and a second light-transmissive layer that is disposed to cover the plurality of second lenses, in which each of the plurality of first lenses overlaps with one corresponding lens among the plurality of second lenses, a first flat portion is disposed between two lenses among the plurality of first lenses, the two lenses neighboring each other with a vertex of the substantial polygon interposed therebetween, a second flat portion is disposed between two lenses among the plurality of second lenses, the two lenses neighboring each other with a vertex of the substantial polygon interposed therebetween, and the first flat portion and the second flat portion are arranged in order for at least a part of the first flat portion and a part of the second flat portion to overlap with each other in a planar view.

In this case, since the first lens and the second lens are arranged to overlap with each other in a planar view, light that is incident from the substrate is condensed by the first lens and is further condensed by the second lens. Thus, the efficiency of use of light can be improved. In addition, in this case, at least a part of the first flat portion that is disposed between the first lenses which neighbor each other at a vertex of the substantial polygon and is substantially parallel to the first face of the substrate and a part of the second flat portion that is disposed between the second lenses which neighbor each other at a vertex of the substantial polygon and is substantially parallel to the first face of the substrate are arranged to overlap with each other in a planar view. Thus, since at least a part of light that is incident on the first flat portion in a substantially vertical direction and travels straight is incident on the second flat portion, light that is incident on the end portion of the second lens is reduced. Accordingly, stray light caused by total internal reflection of light that is incident on the end portion of the second lens can be suppressed.

Application Example 2

In the lens array substrate according to the application example, it is preferable that the extent of the second flat portion is greater than the extent of the first flat portion.

In this case, since the extent of the second flat portion is greater than the extent of the first flat portion, light that is to be incident on the end portion of the second lens among light that is incident on the first flat portion in a substantially vertical direction and travels straight can be further reduced. Accordingly, stray light caused by total internal reflection of light that is incident on the end portion of the second lens can be suppressed more securely.

Application Example 3

In the lens array substrate according to the application example, it is preferable that the angle between an inclined surface of an end portion of one lens among the plurality of first lenses and the first face of the substrate is less than the angle between an inclined surface of an end portion of one lens among the plurality of second lenses and the first face of the substrate.

In this case, since the angle between the end portion of the first lens and the first face of the substrate is less than the angle between the end portion of the second lens and the first face of the substrate, light that is incident on the end portion of the first lens and is totally reflected by the first lens can be suppressed to a lesser degree. Accordingly, light that is incident on the first lens can be incident on the second lens to a greater degree.

Application Example 4

In the lens array substrate according to the application example, it is preferable that two lenses among the plurality of first lenses are connected to each other, the two lenses neighboring each other with an edge of the substantial polygon interposed therebetween.

In this case, since the first lenses that neighbor each other at an edge of the substantial polygon are connected to each other, the intensity of light that is incident on the first lens is increased. Thus, the intensity of light that is incident on the second lens can be increased.

Application Example 5

It is preferable that the lens array substrate according to the application example further includes a prism that is arranged on the opposite side of the plurality of second lenses from the substrate to overlap with the first flat portion and the second flat portion in a planar view.

In this case, the prism is arranged on the opposite side of the plurality of second lenses from the substrate to overlap with the first flat portion and the second flat portion in a planar view. Thus, light that is to be incident from the substrate, pass through the first flat portion and the second flat portion, and travel straight can be reflected by the prism and can be guided toward the same side as light that is condensed by the second lens.

Application Example 6

In the lens array substrate according to the application example, it is preferable that the width of the prism in a first direction that is along the first face of the substrate is greater than the width of an overlapping part between the first flat portion and the second flat portion in a planar view in the first direction.

In this case, the width of the prism is greater than the width of the overlapping part between the first flat portion and the second flat portion in a planar view. Thus, light that is to pass through the first flat portion and the second flat portion and travel straight can be reflected by the prism to a greater degree and can be guided toward the same side as light that is condensed by the second lens.

Application Example 7

In the lens array substrate according to the application example, it is preferable that the plurality of first lenses is configured by a first lens layer that is arranged to fill a plurality of concave portions disposed on the first face of the substrate and has a different refractive index than the substrate, and the plurality of second lenses is configured by a second lens layer that is arranged on the first light-transmissive layer, has a plurality of convex portions, and has a different refractive index from the second light-transmissive layer.

In this case, the first lens is configured by forming the concave portion in the first face of the substrate and forming the first lens layer to fill the concave portion. Here, the first flat portion that is substantially parallel to the first face is disposed between the first lenses that neighbor each other at a vertex of the substantial polygon. Thus, when the concave portion is formed by etching the substrate through an opening portion of a mask layer from the first face, the first face of the substrate remains between the concave portions that neighbor each other at a vertex of the substantial polygon and thus can support the mask layer. This can suppress the mask layer being detached and peeled in the process of forming the concave portion through etching and thus can reduce variations in manufacturing of the lens array substrate and can increase the yield of the lens array substrate.

Application Example 8

According to this application example, there is provided an optoelectronic device including an element substrate that includes a switching element which is disposed in each of a plurality of pixels and a light-blocking portion which has an opening portion corresponding to each of the plurality of pixels and is disposed to overlap with the switching element in a planar view, the lens array substrate according to any one of the application examples 1 to 7 is arranged opposite the element substrate, and an optoelectronic layer that is arranged between the element substrate and the lens array substrate, in which each of the plurality of first lenses and each of the plurality of second lenses are arranged to overlap with the corresponding opening portion in a planar view, and the first flat portion and the second flat portion are arranged to overlap with the light-blocking portion in a planar view.

In this case, the optoelectronic device includes the first lens and the second lens, all of which are arranged to overlap with, in a planar view, the opening portion of each of the plurality of pixels that is disposed in the light-blocking portion which shields the switching element from light. Thus, light that is to be blocked by the light-blocking portion when being incident from the lens array substrate and traveling straight can be condensed by the first lens and the second lens and can be guided into the opening portion of the pixel. Since the first flat portion and the second flat portion are arranged to overlap with each other in a planar view, stray light caused by total internal reflection of light that is incident on the end portion of the second lens can be suppressed. In addition, the first flat portion and the second flat portion are arranged to overlap with the light-blocking portion in a planar view. Thus, even when light that passes through the first flat portion and the second flat portion is reflected by the light-blocking portion, the reflective light passes through the second flat portion and the first flat portion, returns to the incidence side, and is emitted outside from the second substrate. Accordingly, stray light that is caused by total internal reflection of light, which is reflected by the light-blocking portion, in the end portion of the first lens or the end portion of the second lens can be suppressed. These can improve the efficiency of use of light in the optoelectronic device and can suppress degradation of display quality and degradation of the contrast of an image displayed by the optoelectronic device.

Application Example 9

According to this application example, there is provided an optoelectronic device including an element substrate that includes a light-receiving element which is disposed in each of a plurality of pixels and a light-blocking portion which includes an opening portion corresponding to each of the plurality of pixels, and the lens array substrate according to any one of the application examples 1 to 4 is arranged opposite the element substrate, in which each of the plurality of first lenses and each of the plurality of second lenses are arranged to overlap with the corresponding light-receiving element and the corresponding opening portion in a planar view, and the first flat portion and the second flat portion are arranged to overlap with the light-blocking portion in a planar view.

In this case, the optoelectronic device includes the light-receiving element, the first lens and the second lens, all of which are arranged to overlap with, in a planar view, the opening portion of each of the plurality of pixels that is disposed in the light-blocking portion. Thus, light that is to be blocked by the light-blocking portion when being incident from the lens array substrate and traveling straight can be condensed by the first lens and the second lens and can be guided to the light-receiving element that is arranged in the opening portion of the pixel. Since the first flat portion and the second flat portion are arranged to overlap with each other in a planar view, stray light caused by total internal reflection of light that is incident on the end portion of the second lens can be suppressed. In addition, the first flat portion and the second flat portion are arranged to overlap with the light-blocking portion in a planar view. Thus, even when light that passes through the first flat portion and the second flat portion is reflected by the light-blocking portion, the reflective light passes through the second flat portion and the first flat portion, returns to the incidence side, and is emitted outside from the lens array substrate. Accordingly, stray light that is caused by total internal reflection of light, which is reflected by the light-blocking portion, in the end portion of the first lens or the end portion of the second lens can be suppressed. These can improve the efficiency of use of light in the optoelectronic device and can suppress degradation of quality and degradation of the contrast of an image obtained by the optoelectronic device.

Application Example 10

According to this application example, there is provided an electronic apparatus including an optoelectronic device that is manufactured through a method of manufacturing the optoelectronic device according to the application example or the optoelectronic device according to the application example.

In this case, there can be provided the electronic apparatus that can display or obtain a bright image with excellent quality.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments in which the invention is embodied will be described with reference to the drawings. The drawings used herein illustrate parts described therein in an enlarged, reduced, or exaggerated manner in order that the described parts can be recognized. In addition, illustrations may be omitted for constituents that are not necessary for description of the embodiments.

In the embodiments below, for example, when the expression "on a (the) substrate" is written, this is assumed to indicate a case where an object is arranged on a substrate in contact, a case where an object is arranged on a substrate with other constituents interposed therebetween, or a case where an object is arranged on a substrate partially in contact and partially with other constituents interposed therebetween.

First Embodiment

Optoelectronic Device

In a first embodiment, an active matrix liquid crystal device provided with a thin film transistor (TFT) as a switching element for pixels will be described as an example of an optoelectronic device. This liquid crystal device can be suitably used as, for example, an optical modulating element (liquid crystal light valve) of a projective display apparatus (projector) that will be described later.

Figure 1:
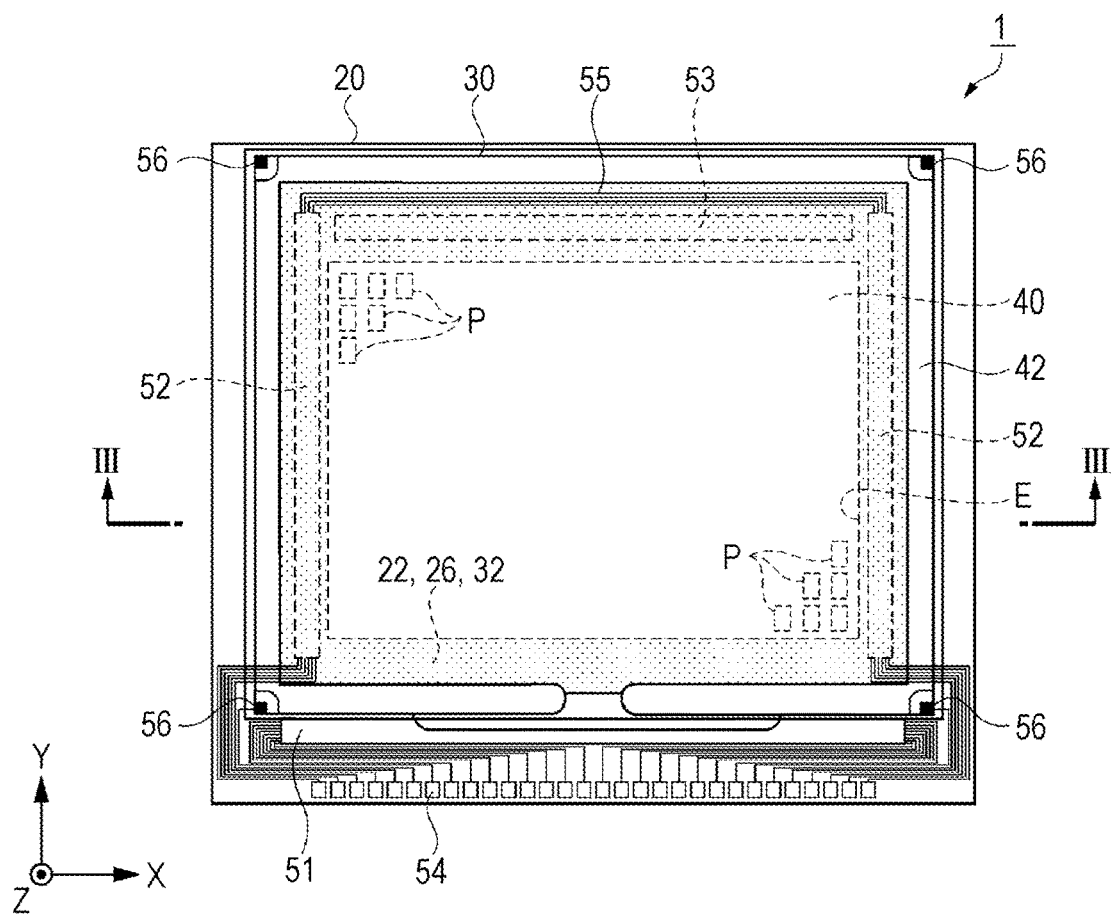
FIG. 1 is a schematic plan view illustrating the configuration of a liquid crystal device that is in accordance with a first embodiment.
Figure 2:
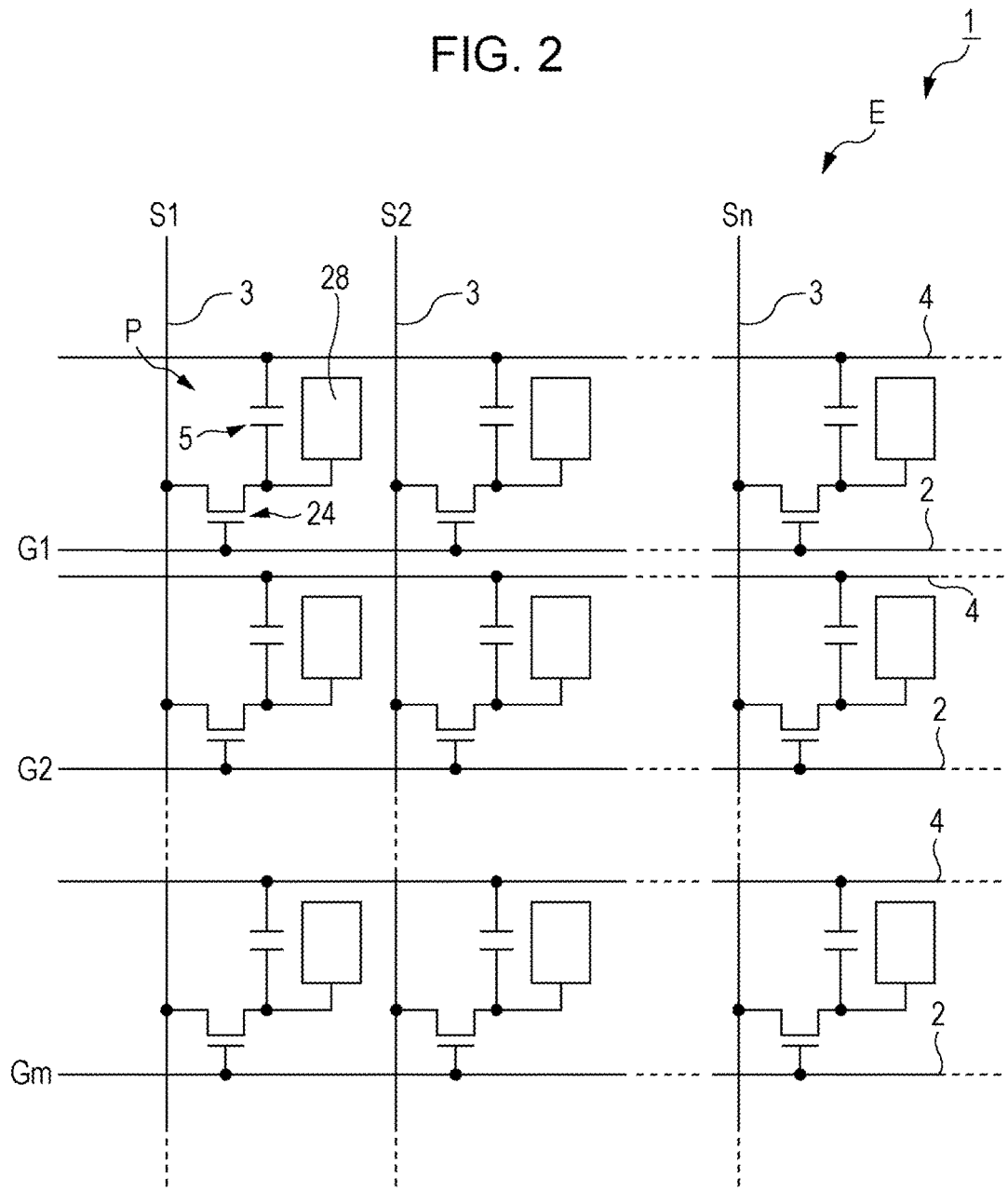
FIG. 2 is an equivalent circuit diagram illustrating the electrical configuration of the liquid crystal device that is in accordance with the first embodiment.
Figure 3:
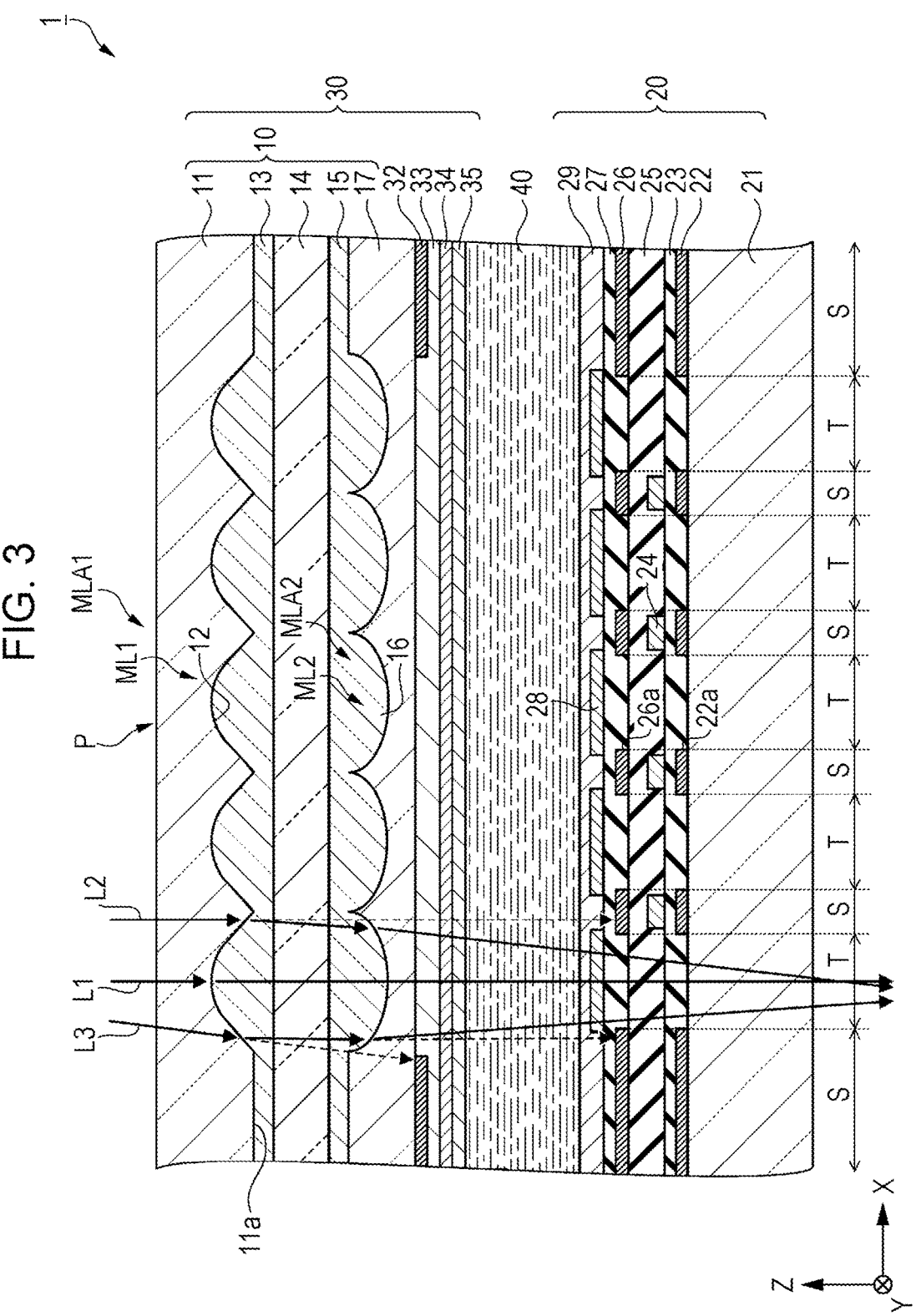
FIG. 3 is a schematic cross-sectional view illustrating the configuration of the liquid crystal device that is in accordance with the first embodiment.

First, the liquid crystal device as the optoelectronic device that is in accordance with the first embodiment will be described with reference to FIG. 1, FIG. 2, and FIG. 3. FIG. 1 is a schematic plan view illustrating the configuration of the liquid crystal device that is in accordance with the first embodiment. FIG. 2 is an equivalent circuit diagram illustrating the electrical configuration of the liquid crystal device that is in accordance with the first embodiment. FIG. 3 is a schematic cross-sectional view illustrating the configuration of the liquid crystal device that is in accordance with the first embodiment. Specifically, FIG. 3 is a schematic cross-sectional view that is taken along the line III-III in FIG. 1.

A liquid crystal device 1 that is in accordance with the present embodiment is provided with an element substrate 20 as a first substrate, an opposite substrate 30 that is arranged opposite the element substrate 20 as a second substrate, a sealing material 42, and a liquid crystal layer 40 as an optoelectronic layer as illustrated in FIG. 1 and FIG. 3. As illustrated in FIG. 1, the element substrate 20 is greater than the opposite substrate 30, and both substrates are bonded through the sealing material 42 that is arranged into a shape of a frame along the edge portion of the opposite substrate 30.

The liquid crystal layer 40 is configured of a liquid crystal that has a positive or negative dielectric anisotropy and is sealed in a space enclosed with the element substrate 20, the opposite substrate 30, and the sealing material 42. The sealing material 42 is formed from an adhesive such as a thermosetting or ultraviolet-curable epoxy resin. A spacer (not illustrated) is mixed in the sealing material 42 to maintain a constant interval between the element substrate 20 and the opposite substrate 30.

Light-blocking layers 22 and 26 disposed in the element substrate 20 and a light-blocking layer 32 disposed in the opposite substrate 30 are arranged inside the sealing material 42 that is arranged into a shape of a frame. The light-blocking layers 22, 26, and 32 have a peripheral portion that has a shape of a frame and are formed of, for example, a light-blocking metal or a metal oxide. The inside of the light-blocking layers 22, 26, and 32 that have a shape of a frame is configured as a display area E in which a plurality of pixels P is arranged. The pixel P has a shape of a substantially polygonal flat surface. The pixel P, for example, has a shape of a substantial rectangle and is arranged into a shape of a matrix.

The display area E is an area that substantially contributes to displaying in the liquid crystal device 1. The light-blocking layers 22 and 26 disposed in the element substrate 20 are disposed into, for example, a shape of a lattice in the display area E in order to section an opening area of the plurality of pixels P in a planar manner. The liquid crystal device 1 may be provided with a dummy area that is disposed to enclose the display area E and does not substantially contribute to displaying.

A data line drive circuit 51 and a plurality of external connection terminals 54 are disposed along a first edge of the element substrate 20 on the opposite side of the sealing material 42, which is formed along the first edge of the element substrate 20, from the display area E. In addition, an inspection circuit 53 is disposed on the display area E side of the sealing material 42 along another second edge that is opposite the first edge. Furthermore, a scan line drive circuit 52 is disposed on the inside of the sealing material 42 along other two edges that are perpendicular to the first and second edges and are opposite each other.

A plurality of wirings 55 that connects two of the scan line drive circuit 52 is disposed on the display area E side of the sealing material 42 at the second edge where the inspection circuit 53 is disposed. These wirings that are connected to the data line drive circuit 51 and the scan line drive circuit 52 are connected to the plurality of external connection terminals 54. An upper and lower conducting portion 56 is disposed at the corner portions of the opposite substrate 30 in order to provide electrical conduction between the element substrate 20 and the opposite substrate 30. The arrangement of the inspection circuit 53 is not limited to that above and may be disposed at a position along the inside of the sealing material 42 between the data line drive circuit 51 and the display area E.

In the description below, the direction along the first edge where the data line drive circuit 51 is disposed is given an X direction as a first direction, and the direction along the other two edges that are perpendicular to the first edge and are opposite each other is given a Y direction as a second direction. The X direction is a direction along the line III-III in FIG. 1. The light-blocking layers 22 and 26 are disposed into a shape of a lattice along the X direction and the Y direction. The opening area of the pixel P is sectioned into a shape of a lattice by the light-blocking layers 22 and 26 and is arranged into a shape of a matrix along the X direction and the Y direction.

The direction that is perpendicular to the X direction and the Y direction and is directed toward the top in FIG. 1 is given a Z direction. In the present specification, a view that is seen from the normal direction (Z direction) of the surface on the opposite substrate 30 side of the liquid crystal device 1 is referred to as a "planar view".

In the display area E, as illustrated in FIG. 2, a scan line 2 and a data line 3 are formed to intersect with each other, and the pixel P is disposed in a manner corresponding to the intersection of the scan line 2 and the data line 3. A pixel electrode 28 and a TFT 24 as a switching element are disposed in each of the pixel P.

The source electrode (not illustrated) of the TFT 24 is electrically connected to the data line 3 that extends from the data line drive circuit 51. Image signals (data signals) S1, S2, . . . , Sn are supplied to the data line 3 in a line-sequential manner from the data line drive circuit 51 (refer to FIG. 1). The gate electrode (not illustrated) of the TFT 24 is a part of the scan line 2 that extends from the scan line drive circuit 52. Scan signals G1, G2, . . . , Gm are supplied to the scan line 2 in a line-sequential manner from the scan line drive circuit 52. The drain electrode (not illustrated) of the TFT 24 is electrically connected to the pixel electrode 28.

The image signals S1, S2, . . . , Sn are written into the pixel electrode 28 through the data line 3 at a predetermined timing by allowing the TFT 24 to go into an ON state for a certain period. The predetermined-level image signal written into the liquid crystal layer 40 through the pixel electrode 28 is held for a certain period in a liquid crystal capacitor that is formed between the liquid crystal layer 40 and a common electrode 34 (refer to FIG. 3) which is disposed in the opposite substrate 30.

To prevent the held image signals S1, S2, . . . , Sn from leaking, a storage capacitor 5 is formed between the pixel electrode 28 and a capacitor line 4 that is formed along the scan line 2. The storage capacitor 5 is arranged in parallel with the liquid crystal capacitor. When a voltage signal is applied to the liquid crystal of each pixel P, the state of orientation of the liquid crystal changes depending on the applied voltage level. Accordingly, light that is incident on the liquid crystal layer 40 (refer to FIG. 3) is modulated and is able to be displayed as a gradation.

The liquid crystal constituting the liquid crystal layer 40 modulates light and enables the light to be displayed as a gradation with the orientation or the order of molecular assemblies changing depending on the applied voltage level. For example, in a case of a normally white mode, the transmittance of incident light decreases depending on the voltage that is applied in units of the pixel P. In a case of a normally black mode, the transmittance of incident light increases depending on the voltage that is applied in units of the pixel P, and light having contrast that is in accordance with the image signal is emitted from the liquid crystal device 1 as a whole.

The opposite substrate 30 that is in accordance with the first embodiment is provided with a microlens array substrate 10, the light-blocking layer 32, a protective layer 33, the common electrode 34, and an oriented film 35 as illustrated in FIG. 3. The microlens array substrate 10 that is in accordance with the first embodiment is provided with a two-stage microlens including a first-stage microlens ML1 and a second-stage microlens ML2.

The microlens array substrate 10 is provided with a substrate 11, a lens layer 13 as a first lens layer, an intermediate layer 14, a lens layer 15 as a second lens layer, and a flattening layer 17. The substrate 11 is formed of a light-transmissive inorganic material such as glass and quartz. The surface on the liquid crystal layer 40 side of the substrate 11 is a surface 11a as a first surface. The substrate 11 has a plurality of concave portions 12 that is formed on the surface 11a. Each concave portion 12 is disposed for each pixel P. The cross-sectional shape of the concave portion 12 has, for example, a curved surface portion in the central portion thereof and an inclined surface (so-called tapered surface) in the peripheral portion thereof that encloses the curved surface portion.

The lens layer 13 is formed to have a greater thickness than the concave portion 12 in order to fill the concave portion 12 and cover the surface 11a of the substrate 11. The lens layer 13 is formed of a light-transmissive material that has a different light refractive index from the substrate 11. In the present embodiment, the lens layer 13 is formed of an inorganic material that has a higher light refractive index than the substrate 11. Examples of such an inorganic material include SiON, and $Al_2O_3$.

The convex microlens ML1 as a first microlens is configured by filling the concave portion 12 with the material that forms the lens layer 13. Therefore, each microlens ML1 is disposed in a manner corresponding to the pixel P. A plurality of microlenses ML1 constitutes a microlens array MLA1. The surface of the lens layer 13 is a flat surface that is substantially parallel to the surface 11a of the substrate 11.

Incident light that is incident on the central portion (curved surface portion) of the microlens ML1 is condensed toward the center (focal point of the curved surface portion) of the microlens ML1. In addition, incident light that is incident on the peripheral portion (inclined surface) of the microlens ML1 is refracted to the center of the microlens ML1 at an approximately the same angle when the angle of incidence is approximately the same. Therefore, excessive refraction of incident light is suppressed, and variations in the angle of incidence of light that is incident on the liquid crystal layer 40 are suppressed, when compared with a case where the entire microlens ML1 is configured as a curved surface portion.

The intermediate layer 14 is formed to cover the lens layer 13. The intermediate layer 14 is formed of a light-transmissive inorganic material that, for example, has approximately the same light refractive index as the substrate 11. Examples of such an inorganic material include $SiO_2$. The intermediate layer 14 has a function of adjusting the distance between the microlens ML1 and the microlens ML2 to a desired value. Therefore, the thickness of the intermediate layer 14 is appropriately set on the basis of optical conditions such as the focal length of the microlens ML1 depending on the wave of light. The intermediate layer 14 may be formed of the same material as the lens layer 13 or may be formed of the same material as the lens layer 15.

The lens layer 15 is formed to cover the intermediate layer 14. The lens layer 15 has a plurality of convex portions 16 that is formed on the liquid crystal layer 40 side of the lens layer 15. Each convex portion 16 is disposed in a manner corresponding to the pixel P. Therefore, each convex portion 16 is arranged to overlap with each concave portion 12 in a planar view. The cross-sectional shape of the convex portion 16 is, for example, a curved surface such as a surface of a substantial ellipsoid. The lens layer 15 is formed of a material that, for example, has approximately the same light refractive index as the lens layer 13 and is the same as the material of the lens layer 13.

The flattening layer 17 is formed to have a greater thickness than the height of the convex portion 16 in order to fill the space between the convex portions 16 and the surrounding area of the convex portion 16 and to cover the lens layer 15. The flattening layer 17 is formed of a light-transmissive inorganic material that, for example, has a lower light refractive index than the lens layer 15. Examples of such an inorganic material include $SiO_2$. The convex microlens ML2 as a second microlens is configured by covering the convex portion 16 with the flattening layer 17. Each microlens ML2 is disposed in a manner corresponding to the pixel P. A plurality of microlenses ML2 constitutes a microlens array MLA2.

The flattening layer 17 has a function of adjusting the distance between the microlens ML2 and the light-blocking layer 26 to a desired value. Therefore, the thickness of the flattening layer 17 is appropriately set on the basis of optical conditions such as the focal length of the microlens ML2 depending on the wave of light. The surface of the flattening layer 17 is a substantially flat surface.

The light-blocking layer 32 is disposed on the microlens array substrate 10 (flattening layer 17). The light-blocking layer 32 is disposed to enclose the display area E (refer to FIG. 1) where the microlens ML1 and the microlens ML2 are arranged. The light-blocking layer 32 is formed of, for example, metal or a metallic compound. The light-blocking layer 32 may be disposed to overlap with a light-blocking layer 22 and the light-blocking layer 26 of the element substrate 20 inside the display area E in a planar view. In this case, the light-blocking layer 32 may be formed into a shape of a lattice, a shape of an island, a shape of a stripe, or the like but is preferably arranged within a narrower extent than the light-blocking layer 22 and the light-blocking layer 26 in a planar view.

The protective layer 33 is disposed to cover the microlens array substrate 10 (flattening layer 17) and the light-blocking layer 32. The common electrode 34 is disposed to cover the protective layer 33. The common electrode 34 is formed over the plurality of pixels P. The common electrode 34 is formed with a transparent conductive film such as an indium tin oxide (ITO) and an indium zinc oxide (IZO). The protective layer 33 covers the light-blocking layer 32 in order for the surface on the liquid crystal layer 40 side of the common electrode 34 to be flat, but the common electrode 34 may be formed to cover the conductive light-blocking layer 32 directly without the disposed protective layer 33. The oriented film 35 is disposed to cover the common electrode 34.

The element substrate 20 is provided with a substrate 21, the light-blocking layer 22, an insulating layer 23, the TFT 24, an insulating layer 25, the light-blocking layer 26, an insulating layer 27, the pixel electrode 28, and an oriented film 29. The substrate 21 is formed of a light-transmissive material such as glass and quartz.

The light-blocking layer 22 is disposed on the substrate 21. The light-blocking layer 22 is formed into a shape of a lattice in order to overlap with the upper light-blocking layer 26 in a planar view. The light-blocking layer 22 and the light-blocking layer 26 are formed of, for example, metal or a metallic compound. The light-blocking layer 22 and the light-blocking layer 26 are arranged in order that the TFT 24 is interposed therebetween in the thickness direction (Z direction) of the element substrate 20. The light-blocking layer 22 overlaps with at least the channel region of the TFT 24 in a planar view.

Disposing the light-blocking layer 22 and the light-blocking layer 26 suppresses light being incident on the TFT 24 and thus can suppress an increase in an optical leakage current in the TFT 24 and malfunctioning of the TFT 24 due to light. The light-blocking layer 22 and the light-blocking layer 26 constitute a light-blocking portion S. The area enclosed by the light-blocking layer 22 (inside of an opening portion 22a) and the area enclosed by the light-blocking layer 26 (inside of an opening portion 26a) overlap with each other in a planar view and are opening portions T where light is transmitted in the area of the pixel P.

The insulating layer 23 is disposed to cover the substrate 21 and the light-blocking layer 22. The insulating layer 23 is formed of an inorganic material such as $SiO_2$.

The TFT 24 is disposed on the insulating layer 23 and is arranged in the area that overlaps with the light-blocking layer 22 and the light-blocking layer 26 in a planar view. The TFT 24 is a switching element that drives the pixel electrode 28. The TFT 24 is configured by a semiconductor layer, a gate electrode, a source electrode, and a drain electrode, all of which are not illustrated. A source region, a channel region, and a drain region are formed in the semiconductor layer. A lightly doped drain (LDD) region may be formed at the interface between the channel region and the source region or between the channel region and the drain region.

The gate electrode is formed in the area that overlaps with the channel region of the semiconductor layer in a planar view with a part of the insulating layer 25 (gate insulating film) interposed between the gate electrodes in the element substrate 20. Although not illustrated, the gate electrode is electrically connected through a contact hole to a scan line that is arranged in the lower layer and controls the TFT 24 to be ON/OFF according to the applied scan signal.

The insulating layer 25 is disposed to cover the insulating layer 23 and the TFT 24. The insulating layer 25 is formed of an inorganic material such as $SiO_2$. The insulating layer 25 includes a gate insulating film that insulates the semiconductor layer from the gate electrode of the TFT 24. The insulating layer 25 reduces surface roughness caused by the TFT 24. The light-blocking layer 26 is disposed on the insulating layer 25. The insulating layer 27 formed of an inorganic material is disposed to cover the insulating layer 25 and the light-blocking layer 26.

The pixel electrode 28 is disposed on the insulating layer 27 in a manner corresponding to the pixel P. The pixel electrode 28 is arranged in the area that overlaps with the opening portion 22a of the light-blocking layer 22 and the opening portion 26a of the light-blocking layer 26 in a planar view. The pixel electrode 28 is formed with a transparent conductive film such as an indium tin oxide (ITO) and an indium zinc oxide (IZO). The oriented film 29 is disposed to cover the pixel electrode 28. The liquid crystal layer 40 is sealed between the oriented film 29, which is on the element substrate 20 side of the liquid crystal layer 40, and the oriented film 35, which is on the opposite substrate 30 side of the liquid crystal layer 40.

A capacitive electrode and the like, although not illustrated, that constitute an electrode, wiring, a relay electrode, and the storage capacitor 5 (refer to FIG. 2) for supplying electrical signals to the TFT 24 are disposed in the area that overlaps with the light-blocking layer 22 and the light-blocking layer 26 in a planar view. The light-blocking layer 22 and the light-blocking layer 26 may be configured to include the electrode, the wiring, the relay electrode, the capacitive electrode, and the like.

In the liquid crystal device 1 that is in accordance with the first embodiment, light emitted from, for example, a light source is incident on the opposite substrate 30 (substrate 11) that is provided with the microlenses ML1 and ML2. Among rays of the incident light, a ray of light L1 that is incident at the center of the microlens ML1 along the normal direction of the surface of the opposite substrate 30 (substrate 11) travels straight to be incident at the center of the microlens ML2, travels straight to pass through the opening portion T of the pixel P, and is emitted from the element substrate 20.

The normal direction of the surface of the opposite substrate 30 (substrate 11) will be simply referred to as a "normal direction" hereinafter. A "normal direction" is a direction along the Z direction in FIG. 3 and is approximately the same as the normal direction of the element substrate 20 (substrate 21).

A ray of light L2 that is incident on the end portion of the microlens ML1 along the normal direction, when traveling straight, is blocked by the light-blocking layer 26 as illustrated with a broken line but is refracted toward the center of the microlens ML1 because of the difference in the light refractive index between the substrate 11 and the lens layer 13 (positive refractive power) and is incident on the microlens ML2. The ray of light L2 that is incident on the microlens ML2 is further refracted toward the center of the microlens ML2 because of the difference in the light refractive index between the lens layer 15 and the flattening layer 17 (positive refractive power) and passes through the opening portion T of the pixel P to be emitted from the element substrate 20.

A ray of light L3 that is incident on the end portion of the microlens ML1 in an inclined direction with respect to the normal direction outward from the center of the microlens ML1, when traveling straight, is blocked by the light-blocking layer 32 as illustrated with a broken line but is refracted toward the center of the microlens ML1 because of the difference in the light refractive index between the substrate 11 and the lens layer 13 and is incident on the microlens ML2. The ray of light L3 that is incident on the microlens ML2, when traveling straight, is blocked by the light-blocking layer 26 as illustrated with a broken line but is further refracted toward the center of the microlens ML2 because of the difference in the light refractive index between the lens layer 15 and the flattening layer 17 and passes through the opening portion T of the pixel P to be emitted from the element substrate 20.

As such, in the liquid crystal device 1, the rays of light L2 and L3 that are blocked by the light-blocking layer 32 and the light-blocking layer 26 when traveling straight can be refracted toward the center of the opening portion T of the pixel P by the action of two stages of the microlenses ML1 and ML2 and thus can pass through the opening portion T. As a result, the intensity of light emitted from the element substrate 20 is increased, and thus, the efficiency of use of light is improved.

Light is also refracted at the interface between the lens layer 13 and the intermediate layer 14 and the interface between the intermediate layer 14 and the lens layer 15 when the intermediate layer 14 is configured of a material that has a lower light refractive index than the lens layer 13 and the lens layer 15. However, refraction of light at these interfaces is insignificant when compared with refraction of light by the microlenses ML1 and ML2 and thus can be ignored.

Figure 4:
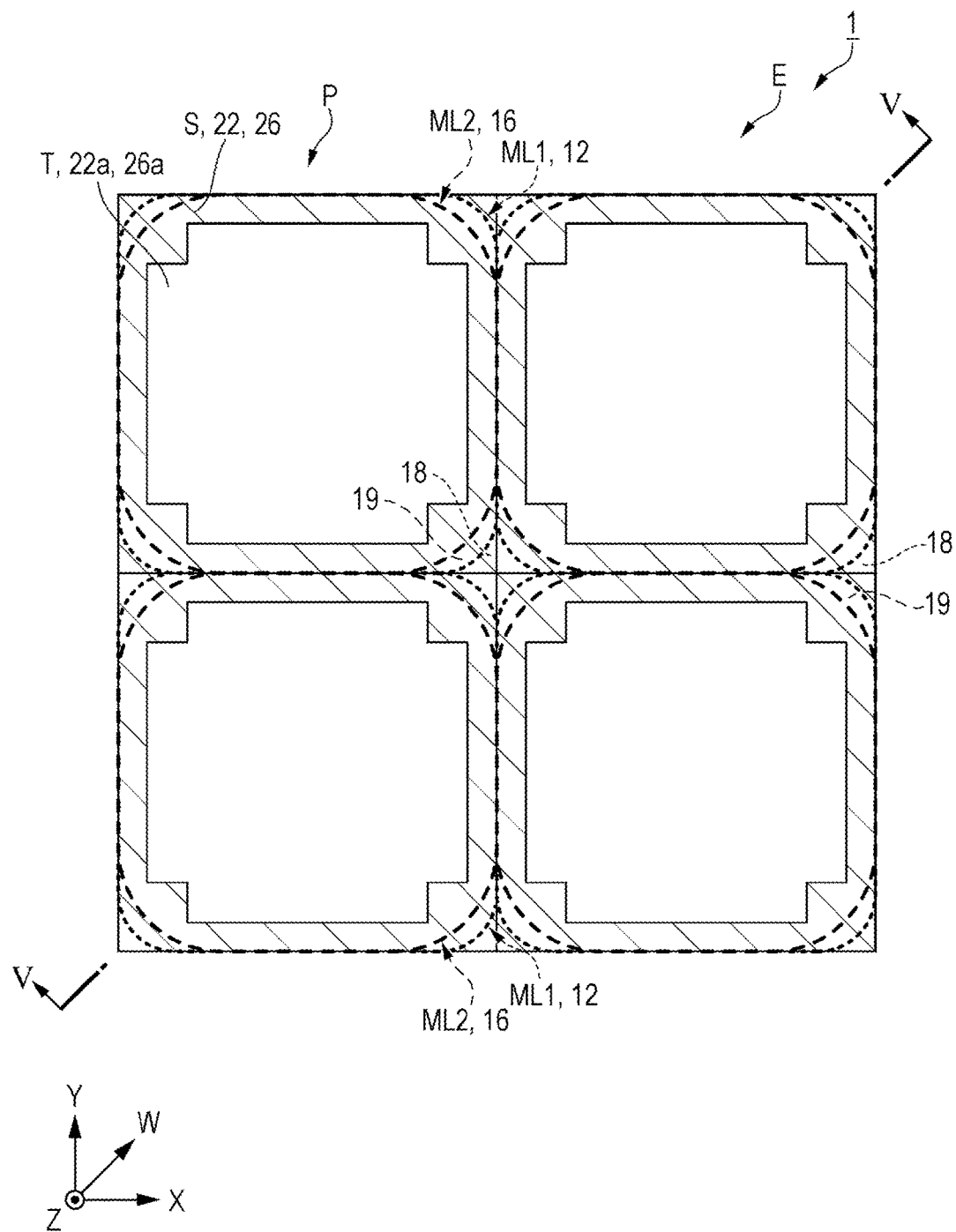
FIG. 4 is a schematic plan view illustrating the shape and the arrangement of a light-blocking portion and a microlens of the liquid crystal device that is in accordance with the first embodiment.
Figure 5:
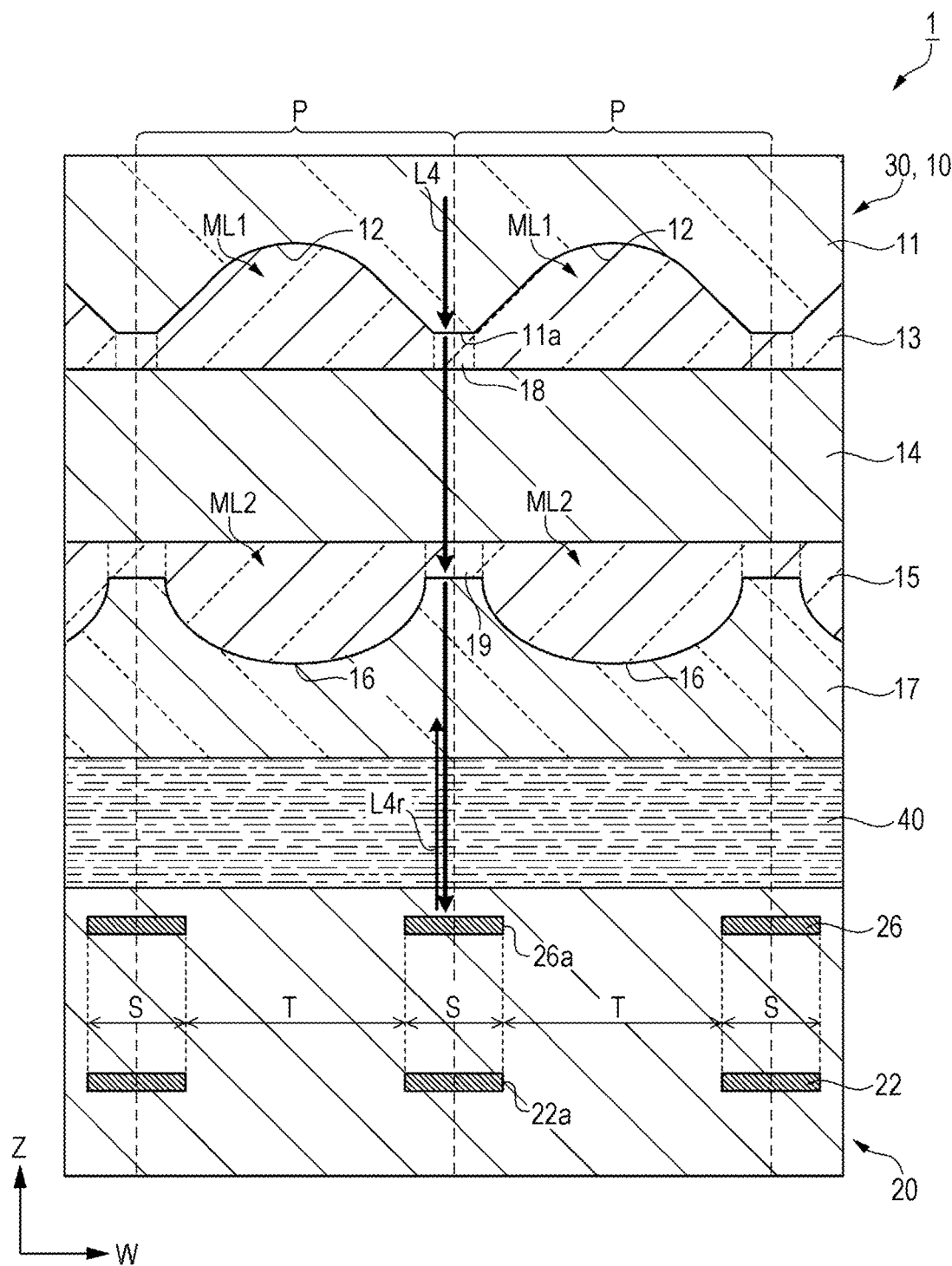
FIG. 5 is a schematic cross-sectional view illustrating the shape and the arrangement of the light-blocking portion and the microlens of the liquid crystal device that is in accordance with the first embodiment.
Figure 16:
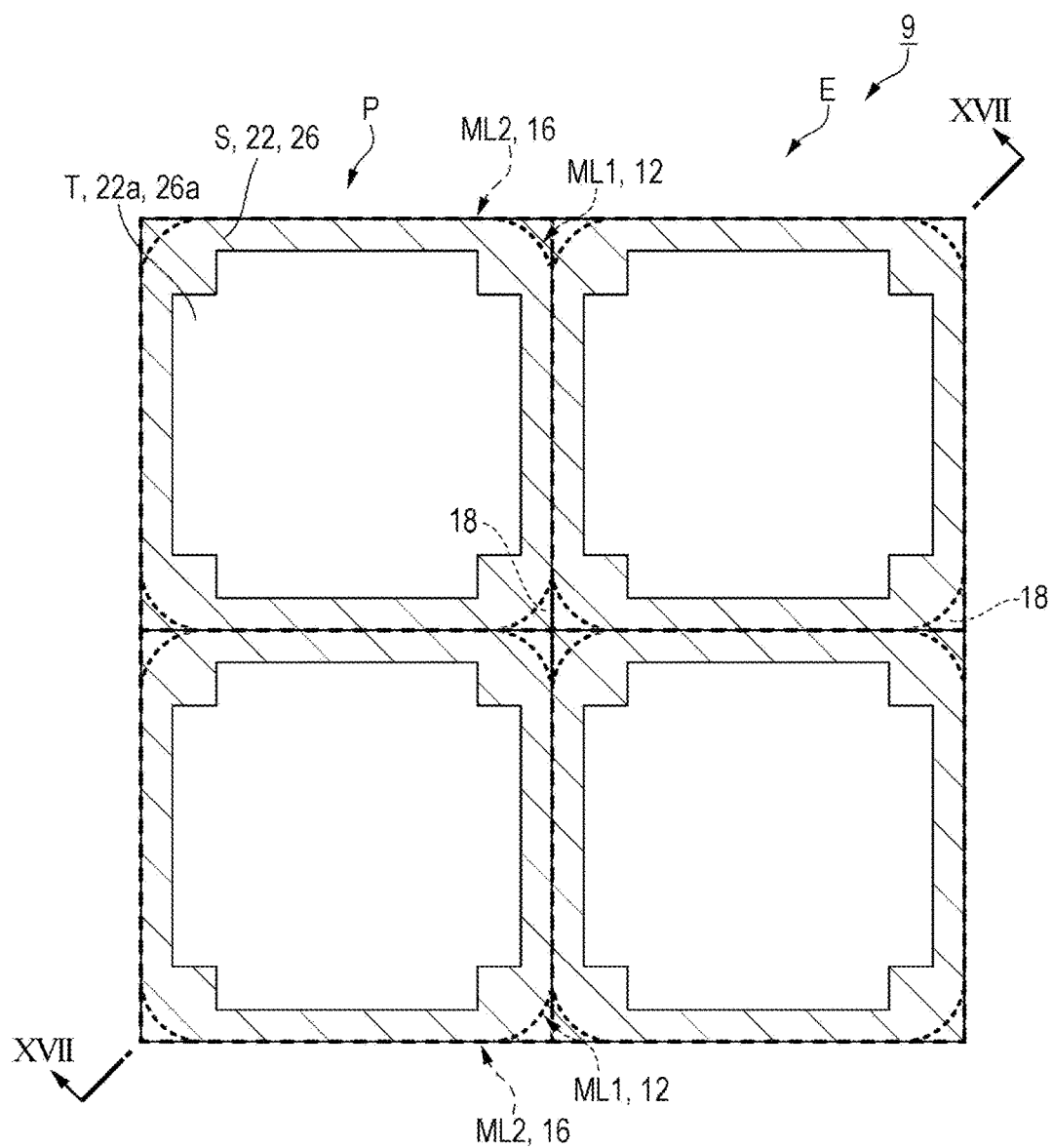
FIG. 16 is a schematic plan view illustrating an example of the shape and the arrangement of a light-blocking portion and a microlens of a liquid crystal device in the related art.
Figure 17:
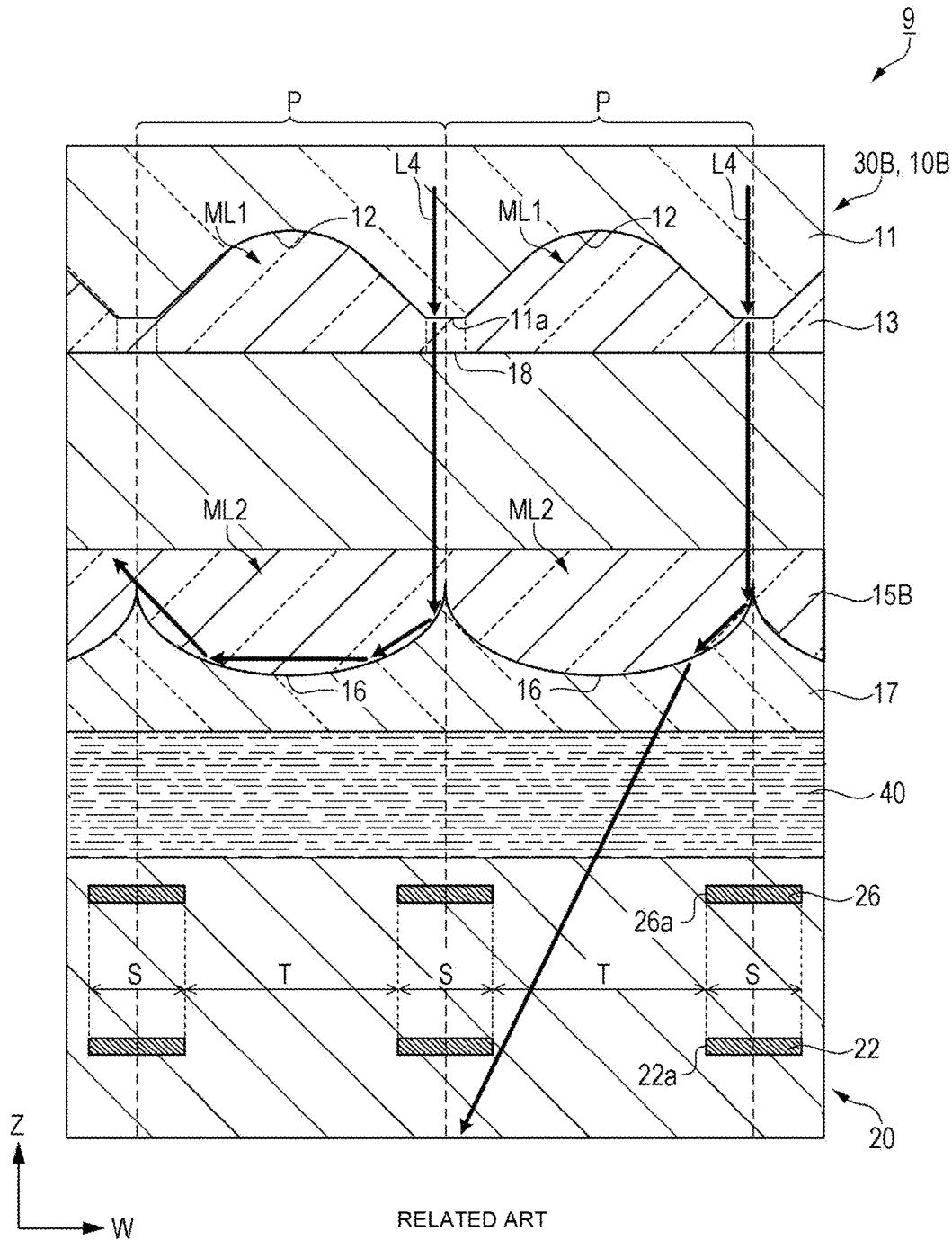
FIG. 17 is a schematic cross-sectional view illustrating an example of the shape and the arrangement of the light-blocking portion and the microlens of the liquid crystal device in the related art.

Next, the shape and the arrangement of the light-blocking portion and the microlenses ML1 and ML2 of the liquid crystal device that is in accordance with the first embodiment will be described with reference to FIG. 4, FIG. 5, FIG. 16, and FIG. 17. FIG. 4 is a schematic plan view illustrating the shape and the arrangement of the light-blocking portion and the microlens of the liquid crystal device that is in accordance with the first embodiment. FIG. 5 is a schematic cross-sectional view illustrating the shape and the arrangement of the light-blocking portion and the microlens of the liquid crystal device that is in accordance with the first embodiment. Specifically, FIG. 5 is a schematic cross-sectional view that is taken along the line V-V in FIG. 4. FIG. 16 is a schematic plan view illustrating an example of the shape and the arrangement of a light-blocking portion and a microlens of a liquid crystal device in the related art. FIG. 17 is a schematic cross-sectional view illustrating an example of the shape and the arrangement of the light-blocking portion and the microlens of the liquid crystal device in the related art. Specifically, FIG. 17 is a schematic cross-sectional view that is taken along the line XVII-XVII in FIG. 16.

The plurality of pixels P, as illustrated in FIG. 4, is arranged into a shape of a matrix at a predetermined arrangement pitch in the display area E of the liquid crystal device 1. FIG. 4 illustrates four pixels P that are neighboring each other. Each pixel P has a planar shape of a substantial polygon (substantial rectangle in FIG. 4). Neighboring pixels P in the X direction and the Y direction are arranged in contact with each other. The direction along the diagonal that connects the vertices positioned at opposite corners of the pixel P is given a W direction. The W direction is a direction that intersects the X direction and the Y direction in a plane configured by the X direction and the Y direction. The line V-V in FIG. 4 is a line along the W direction.

The light-blocking portion S is disposed into a shape of a lattice in the display area E of the liquid crystal device 1 as illustrated with hatching in FIG. 4. The light-blocking portion S is configured by the light-blocking layer 22 and the light-blocking layer 26. In other words, at least one of the light-blocking layer 22 and the light-blocking layer 26 is arranged in the light-blocking portion S. The area that overlaps with the light-blocking portion S in a planar view in the area of each pixel P is a non-opening area that does not transmit light, and the area that overlaps with the opening portion T in a planar view is an opening area that transmits light. The TFT 24 is arranged in the area that overlaps with the light-blocking portion S in a planar view.

The light-blocking portion S has a part extending in the X direction and a part extending in the Y direction. The light-blocking portion S, for example, has a part that protrudes toward the opening portion T at four corner portions. For example, a part of the TFT 24, the unillustrated relay electrode, the capacitive electrode, and the like are arranged in the protruding part of the light-blocking portion S. Forming the light-blocking portion S into such a shape can securely shield the TFT 24 from light while increasing the opening ratio by reducing the area of the light-blocking portion S.

The light-blocking portion S has the opening portion T that corresponds to each of the plurality of pixels P. The contour of the opening portion T is shaped into a substantial rectangle having four dented corner portions. The shape of the contour of the opening portion T has line symmetry with respect to a line along the X direction and a line along the Y direction. The shape of the contour of the opening portion T (the planar shape of the light-blocking portion S) is not limited to such a form and may have the four corner portions not dented or may not have line symmetry with respect to a line along any one of the X direction and the Y direction.

The opening portion T is the area that overlaps with the opening portion 22a and the opening portion 26a in a planar view. When the light-blocking layer 32 is also disposed in the display area E, the light-blocking portion S is configured by the light-blocking layer 22, the light-blocking layer 26, and the light-blocking layer 32, and the opening portion T is the area that overlaps with the opening portion 22a, the opening portion 26a, and the opening portion of the light-blocking layer 32 in a planar view.

Each of the plurality of microlenses ML1 (concave portions 12) and each of the plurality of microlenses ML2 (convex portions 16) are arranged at the same arrangement pitch in a manner corresponding to each of the plurality of pixels P as illustrated with broken lines in FIG. 4. The microlens ML1 (concave portion 12) and the microlens ML2 (convex portion 16) are arranged to overlap with each other and overlap with the opening portion T of the pixel P in a planar view.

The planar shape of the microlens ML1 (concave portion 12) and the microlens ML2 (convex portion 16) is substantially polygonal and, for example, substantially rectangular. The exterior shape of the microlens ML1 (concave portion 12) and the microlens ML2 (convex portion 16) is great enough to be inscribed in the pixel P. The microlenses ML1 (concave portions 12) and the microlenses ML2 (convex portions 16), each of which neighbors each other at an edge of a substantial rectangle, that is, the neighboring microlenses ML1 in the X direction and the Y direction are connected to each other, and the neighboring microlenses ML2 in the X direction and the Y direction are connected to each other. Since the microlenses ML1 (concave portions 12) neighboring each other at an edge are connected to each other, the intensity of light that is incident on the microlens ML1 is increased. Thus, the intensity of light that is incident on the microlens ML2 can be increased.

The boundary between the neighboring microlenses ML1 and the boundary the neighboring microlenses ML2 in the X direction and the Y direction are arranged in the area that overlaps with the part of the light-blocking portion S extending in the X direction and the part of the light-blocking portion S extending in the Y direction in a planar view. The four corner portions (vertices) of the microlens ML1 (concave portion 12) and the microlens ML2 (convex portion 16) are arranged inward (toward the opening portion T) from the corner portions (vertices) of the pixel P in the area that overlaps with a part where the part of the light-blocking portion S extending in the X direction and the part of the light-blocking portion S extending in the Y direction intersect in a planar view.

The four corner portions of the microlens ML1 (concave portion 12) and the microlens ML2 (convex portion 16), for example, are rounded. Therefore, the microlenses ML1 (concave portions 12) and the microlenses ML2 (convex portions 16), each of which neighbors each other at a vertex of a substantial rectangle, that is, the neighboring microlenses in the direction along the diagonal (W direction) are separated from each other.

A flat portion 18 as a first flat portion is disposed between the microlenses ML1 (concave portions 12) that neighbor each other in the direction along the diagonal (W direction) as illustrated in FIG. 4 and FIG. 5. A flat portion 19 as a second flat portion is disposed between the microlenses ML2 (convex portions 16) that neighbor each other in the direction along the diagonal (W direction). The flat portion 18 and the flat portion 19 are configured by a flat surface that is substantially parallel to the surface 11a of the substrate 11.

The flat portion 18 and the flat portion 19 are arranged to overlap with each other in the area that overlaps with the light-blocking portion S in a planar view. In the present embodiment, the four corner portions (vertices) of the microlens ML2 (convex portion 16) are arranged further inward from the corner portions (vertices) of the pixel P than the four corner portions (vertices) of the microlens ML1 (concave portion 12). Therefore, the extent of the flat portion 19 is greater than the extent of the flat portion 18. In other words, the diameter (length) of the microlens ML2 (convex portion 16) is less than the diameter (length) of the microlens ML1 (concave portion 12) in the direction along the diagonal (W direction).

A ray of light L4 that is incident along the normal direction on the flat portion 18 between the microlenses ML1 (concave portions 12) which neighbor each other in the W direction travels straight and is incident on the flat portion 19 between the neighboring microlenses ML2 (convex portions 16) as illustrated in FIG. 5. The ray of light L4 then travels straight and is blocked by the light-blocking layer 26. When the light-blocking layer 26 is formed of metal or a metallic compound, the ray of light L4 is reflected by the light-blocking layer 26, and this causes a ray of reflective light L4r that returns toward the substrate 11 along the optical path of the incident ray of light L4. The ray of reflective light L4r is emitted outside from the substrate 11 after being incident on the flat portion 19, traveling straight, and being incident on the flat portion 18.

In the related art, a liquid crystal device such as a liquid crystal device 9 illustrated in FIG. 16 may have a configuration in which the neighboring microlenses ML2 (convex portions 16) in the W direction are not separated from each other, and a flat portion is not disposed in a lens layer 15B (refer to FIG. 17). In the liquid crystal device 9 having such a configuration as illustrated in FIG. 17, the ray of light L4 that is incident on the flat portion 18 along the normal direction travels straight and is incident on the end portion of the microlens ML2 (convex portion 16).

Since the cross-sectional shape of the microlens ML2 (convex portion 16) is a curved surface such as a surface of a substantial ellipsoid and a surface of a substantial sphere, the angle between the tangent of the curved surface in the end portion and the surface 11a is, for example, close to 90°. Thus, the ray of light L4 that is incident on the microlens ML2 may be totally reflected by the inner surface (interface between the convex portion 16 and the flattening layer 17) of the microlens ML2. Then, the totally reflected ray of light L4 travels in an inclined direction or is repeatedly reflected by the inner surface of the microlens ML2, thus causing stray light. When such stray light occurs, this may cause the contrast of the liquid crystal device 9 to be degraded or cause degradation of display quality such as a flicker and crosstalk due to an increase in the optical leakage current in the TFT 24 (refer to FIG. 3).

In the liquid crystal device 1 that is in accordance with the first embodiment, as illustrated in FIG. 5, the flat portion 19 is disposed between the neighboring microlenses ML2 (convex portions 16) to overlap with the flat portion 18 in a planar view, and the extent of the flat portion 19 is greater than the extent of the flat portion 18. In other words, the area where the flat portion 19 is formed is formed to include the area where the flat portion 18 is formed. Thus, the ray of light L4 that is incident on the flat portion 18 along the normal direction is incident on the flat portion 19 but is not incident on the end portion of the microlens ML2 (convex portion 16). Even when variations occur in the planar positional relationship between the microlens ML1 (concave portion 12) and the microlens ML2 (convex portion 16), a risk that the ray of light L4 that is incident on the flat portion 18 along the normal direction is incident on the end portion of the microlens ML2 (convex portion 16) can be suppressed to a lesser degree.

Accordingly, the liquid crystal device 1 can suppress stray light that is caused by total internal reflection of the ray of light L4 which is incident on the end portion of the microlens ML2 as in the liquid crystal device 9. In addition, since the peripheral portion of the microlens ML1 (concave portion 12) is configured as an inclined surface, the angle between the inclined surface and the surface 11a is less than the angle between the tangent of the curved surface in the end portion of the microlens ML2 (convex portion 16) and the surface 11a. Thus, light that is incident on the end portion of the microlens ML1 and is totally reflected by the microlens ML1 can be suppressed to a lesser degree. This can improve the efficiency of use of light in the liquid crystal device 1 and can suppress degradation of display quality and degradation of the contrast of an image displayed by the liquid crystal device 1.

Method for Manufacturing Microlens Array Substrate

Next, a description will be provided for a method for manufacturing the microlens array substrate 10 that is in accordance with the first embodiment. FIGS. 6A to 6E and FIGS. 7A to 7E are schematic cross-sectional views illustrating a method of manufacturing the microlens array substrate 10 that is in accordance with the first embodiment.

Specifically, each of FIGS. 6A to 6E and FIGS. 7A to 7E corresponds to the schematic cross-sectional view that is taken along the line A-A' in FIG. 3 but the vertical direction (Z direction) in FIG. 3 is inverted in FIGS. 6A to 6E and FIGS. 7A to 7E.

Figure 6A:
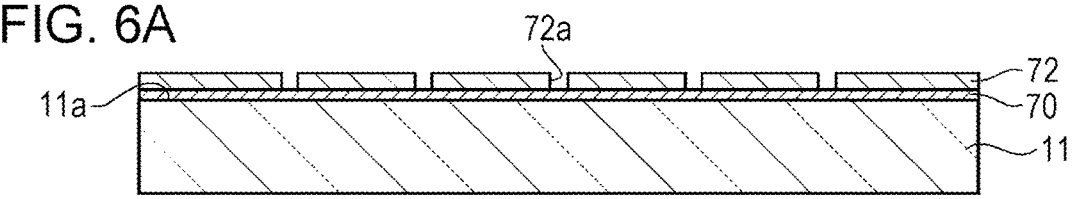
FIGS. 6A to 6E are schematic cross-sectional views illustrating a method of manufacturing a microlens array substrate that is in accordance with the first embodiment.

First, as illustrated in FIG. 6A, a control film 70 that is formed with an oxide film such as $SiO_2$ is formed on the surface 11a of the substrate 11 that is formed of quartz and the like and is light-transmissive. The control film 70 has a different etching rate from the substrate 11 in isotropic etching and has a function of adjusting the etching rate in the width direction (the W direction, the X direction, and the Y direction illustrated in FIG. 4) with respect to the etching rate in the depth direction (Z direction) at the time of forming of the concave portion 12.

The control film 70 is annealed at a predetermined temperature after formed. The etching rate of the control film 70 changes depending on the annealing temperature. Therefore, setting the annealing temperature appropriately can adjust the etching rate of the control film 70.

Next, a mask layer 72 is formed on the control film 70. Then, the mask layer 72 is patterned to form an opening portion 72a in the mask layer 72. The planar position of the center of the opening portion 72a is the center of the concave portion 12 to form. Next, through the opening portion 72a of the mask layer 72, isotropic etching is performed on the substrate 11 that is covered by the control film 70. Although not illustrated, an opening portion is formed through the isotropic etching in the area of the control film 70 that overlaps with the opening portion 72a, and the substrate 11 is etched through the opening portion.

The isotropic etching uses an etching liquid (for example, a hydrofluoric acid solution) that has a greater etching rate for the control film 70 than for the substrate 11. Accordingly, the amount of etching of the control film 70 per unit time is greater than the amount of etching of the substrate 11 per unit time in the isotropic etching. Thus, the amount of etching of the substrate 11 is greater in the width direction than in the depth direction along with enlargement of the opening portion formed in the control film 70.

Figure 6B:

The control film 70 and the substrate 11 are etched from the opening portion 72a through the isotropic etching, and the concave portion 12 is formed on the surface 11a side of the substrate 11 as illustrated in FIG. 6B. According to the setting of the etching rate described above, the concave portion 12 is enlarged greater in the width direction than in the depth direction, and a tapered inclined surface is formed in the peripheral portion of the concave portion 12. FIG. 6B illustrates a state after the mask layer 72 and the control film 70 are removed.

In the present process, the isotropic etching ends in a state where the neighboring concave portions 12 in the X direction and the Y direction are connected to each other, and the neighboring concave portions 12 in the W direction are separated from each other, that is, a state where the surface 11a of the substrate 11 remains between the neighboring concave portions 12 in the W direction (refer to FIG. 5).

When the isotropic etching is performed until the neighboring concave portions 12 in the W direction are connected to each other, the mask layer 72 may be detached and peeled from the substrate 11. In the present embodiment, the isotropic etching ends in a state where the surface 11a of the substrate 11 remains between the neighboring concave portions 12. Thus, the mask layer 72 can be supported until the isotropic etching ends. Accordingly, the planar shape of the concave portion 12 is a substantial rectangle of which four corner portions are rounded (refer to FIG. 4).

Figure 6C:
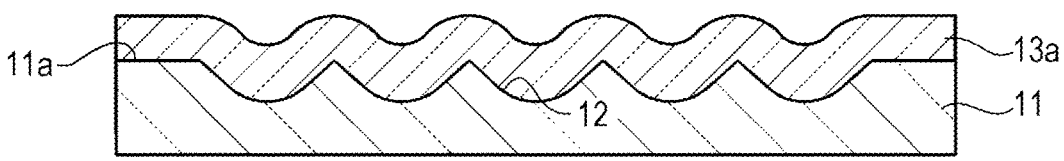

Next, as illustrated in FIG. 6C, a lens material layer 13a is formed by depositing a light-transmissive inorganic material that has a higher light refractive index than the substrate 11 to fill the concave portion 12 that covers the surface 11a side of the substrate 11. The lens material layer 13a can be formed by using, for example, CVD. Since the lens material layer 13a is formed to fill the concave portion 12, the surface of the lens material layer 13a has a rough shape on which roughness caused by the concave portion 12 of the substrate 11 is reflected.

Figure 6D:
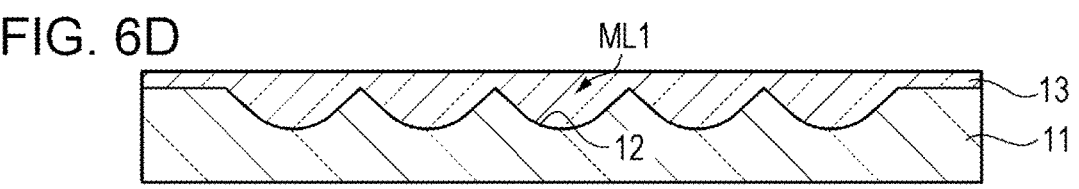

Next, as illustrated in FIG. 6D, a flattening process is performed on the lens material layer 13a. In the flattening process, the upper surface of the lens material layer 13a is flattened by polishing the upper part of the lens material layer 13a where roughness is formed through, for example, chemical mechanical polishing (CMP) process, and this forms the lens layer 13. Then, the microlens ML1 is configured by filling the concave portion 12 with the material of the lens layer 13. The surface 11a of the substrate 11 remains between the neighboring concave portions 12 in the W direction, and the part of the lens layer 13 that is configured as a surface which is substantially parallel to the surface 11a between the neighboring concave portions 12 becomes the flat portion 18 (refer to FIG. 5).

Figure 6E:
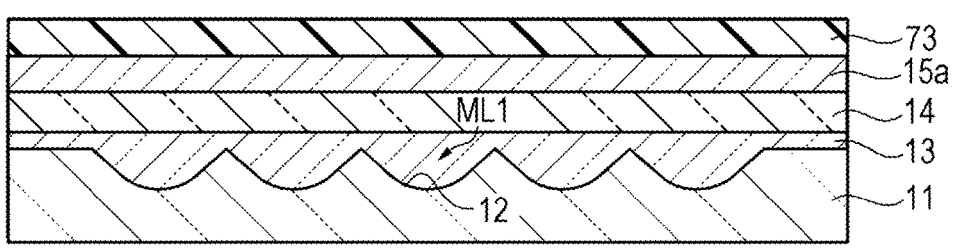

Next, as illustrated in FIG. 6E, the intermediate layer 14 is formed by depositing a light-transmissive inorganic material that, for example, has approximately the same light refractive index as the substrate 11 to cover the lens layer 13. Then, a lens material layer 15a is formed by depositing a light-transmissive inorganic material that has a higher light refractive index than the substrate 11 to cover the upper surface of the intermediate layer 14. The intermediate layer 14 and the lens material layer 15a can be formed by using, for example, CVD.

Next, a resist layer 73 is formed on the lens material layer 15a. The resist layer 73, for example, is formed with a positive photosensitive resist of which an exposed part is removed through developing. The resist layer 73 can be formed through, for example, spin coating or roll coating. Then, although not illustrated, the resist layer 73 is exposed and developed through a mask in which a light-blocking portion is disposed in a manner corresponding to the position where the convex portion 16 is formed.

Figure 7A:
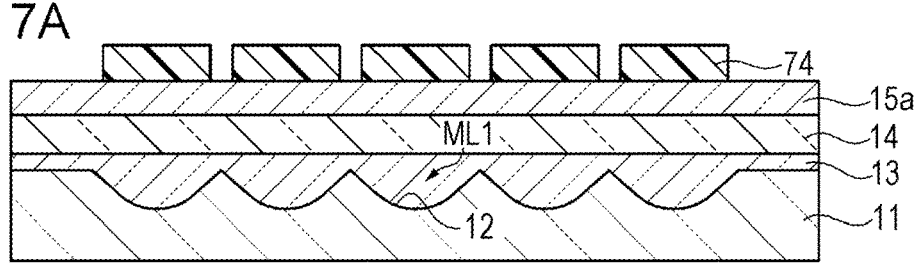
FIGS. 7A to 7E are schematic cross-sectional views illustrating the method of manufacturing the microlens array substrate that is in accordance with the first embodiment.

By exposing and developing the resist layer 73, the area of the resist layer 73 other than the area that overlaps with the light-blocking portion of the mask is exposed and removed, and a part 74 that corresponds to the position where the convex portion 16 is formed in a later process remains as illustrated in FIG. 7A. Therefore, the remaining parts 74 are separated from each other in the X direction, the Y direction, and the W direction. The planar shape of the part 74, for example, is a substantial rectangle of which four corner portions are rounded. As a method for rounding the four corner portions of the part 74, the four corner portions may be round in the mask at the time of exposing the resist layer 73 or may be rectangular in the mask and be rounded at the time of exposing the resist layer 73.

Figure 7B:
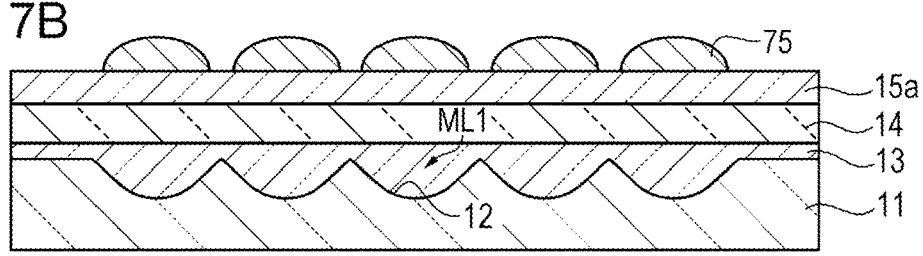

Next, the remaining part 74 of the resist layer 73 is softened (melted) by performing a heating process such as a reflow process. The melted part 74 is in a fluid state, and the surface thereof is deformed into a shape of a curved surface because of the action of surface tension. Accordingly, as illustrated in FIG. 7B, a convex portion 75 having a shape of a surface of a substantial ellipsoid is formed from the remaining part 74 on the lens material layer 15a. The bottom portion (lens material layer 15a side) of the convex portion 75 has a shape of a substantial rectangle of which four corner portions are round in a planar view, but the tip end side (upper side) of the shape of the substantially spherical surface of the convex portion 75 is formed into a shape of a substantial concentric circle in a planar view.

Figure 7C:
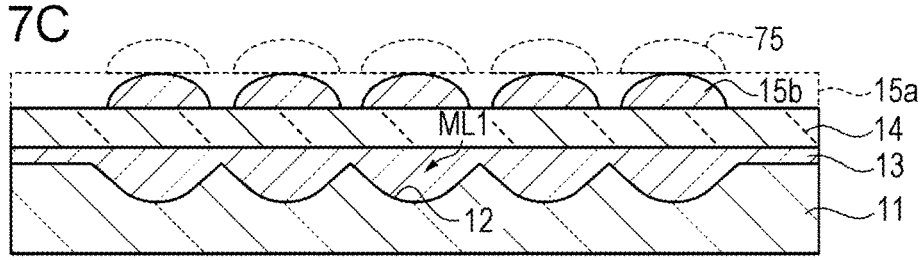

Next, as illustrated in FIG. 7C, anisotropic etching such as dry etching is performed on the convex portion 75 and the lens material layer 15a from the upper side. Accordingly, the convex portion 75 that is formed from the resist is gradually removed, and the exposed part of the lens material layer 15a is etched along with the removal of the convex portion 75. The shape of the convex portion 75 is transferred to the lens material layer 15a, and a convex portion 15b is formed. In the present process, the convex portion 75 and the convex portion 15b can have substantially the same shape by setting conditions that can make the etching rate of the material of the convex portion 75 (resist) and the etching rate of the material of the lens material layer 15a in the anisotropic etching substantially the same.

Figure 7D:
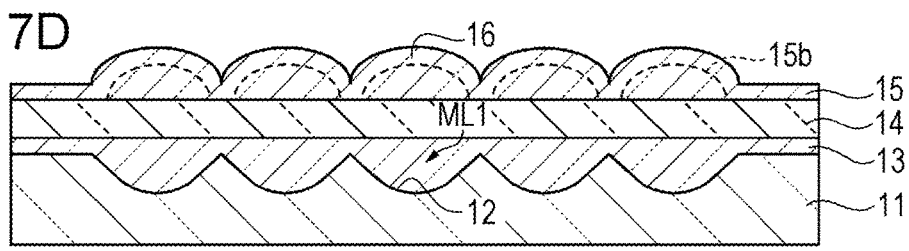

Next, as illustrated in FIG. 7D, the same material as that of the convex portion 15b (lens material layer 15a) is deposited to cover the intermediate layer 14 and the convex portion 15b by using, for example, CVD. Accordingly, the lens layer 15 that has the convex portion 16 corresponding to the convex portion 15b is formed. As a result, the neighboring convex portions 16 in the X direction and the Y direction are connected to each other. In addition, the neighboring convex portions 16 in the W direction are separated from each other, and the part that is between the convex portions 16 and is configured as a surface which is substantially parallel to the surface 11a becomes the flat portion 19 (refer to FIG. 5).

When the part 74 illustrated in FIG. 7B is processed into the shape of the convex portion 75, the convex portion 75 may be formed to have the same shape as the convex portion 16 by, for example, adjusting conditions for the heating process, and the lens layer 15 having the convex portion 16 may be formed by transferring the shape of the convex portion 75 in the process of performing the anisotropic etching illustrated in FIG. 7C. This enables the process illustrated in FIG. 7D to be omitted. In addition, the resist layer 73 may be processed into the shape of the convex portion 75 by using, for example, a method of exposing the resist layer 73 illustrated in FIG. 6E with a grayscale mask or an area gradation mask or a method of exposing the resist layer 73 in a multistage manner.

Figure 7E:
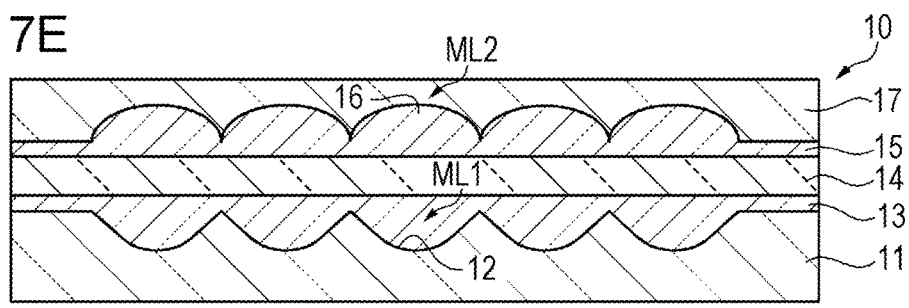

Next, as illustrated in FIG. 7E, the flattening layer 17 is formed by depositing a light-transmissive inorganic material that, for example, has approximately the same light refractive index as the substrate 11 to cover the lens layer 15. Then, the flattening process is performed on the flattening layer 17. The microlens ML2 is configured by covering the convex portion 16 with the flattening layer 17. Accordingly, the microlens array substrate 10 is completed.

The opposite substrate 30 is obtained after the microlens array substrate 10 is completed by forming the light-blocking layer 32, the protective layer 33, the common electrode 34, and the oriented film 35 in order on the microlens array substrate 10 with a known technology. The element substrate 20 is obtained by forming the light-blocking layer 22, the insulating layer 23, the TFT 24, the insulating layer 25, the light-blocking layer 26, the insulating layer 27, the pixel electrode 28, and the oriented film 29 in order on the substrate 21 with a known method.

Next, the element substrate 20 and the opposite substrate 30 are positioned, and a thermosetting or light-curable adhesive is arranged as the sealing material 42 (refer to FIG. 1) between the element substrate 20 and the opposite substrate 30 and is cured to attach the element substrate 20 to the opposite substrate 30. Then, a liquid crystal is sealed in the space configured by the element substrate 20, the opposite substrate 30, and the sealing material 42 to complete the liquid crystal device 1. A liquid crystal may be arranged in the area enclosed by the sealing material 42 before attaching the element substrate 20 to the opposite substrate 30.

The microlens ML1 is configured to have an inclined surface in the peripheral portion of the concave portion 12 but may be configured to have a curved surface portion in the entire concave portion 12, not having an inclined surface in the peripheral portion of the concave portion 12. In this case, the control film 70 may not be disposed when the concave portion 12 is formed.

Second Embodiment

Optoelectronic Device

Figure 8:
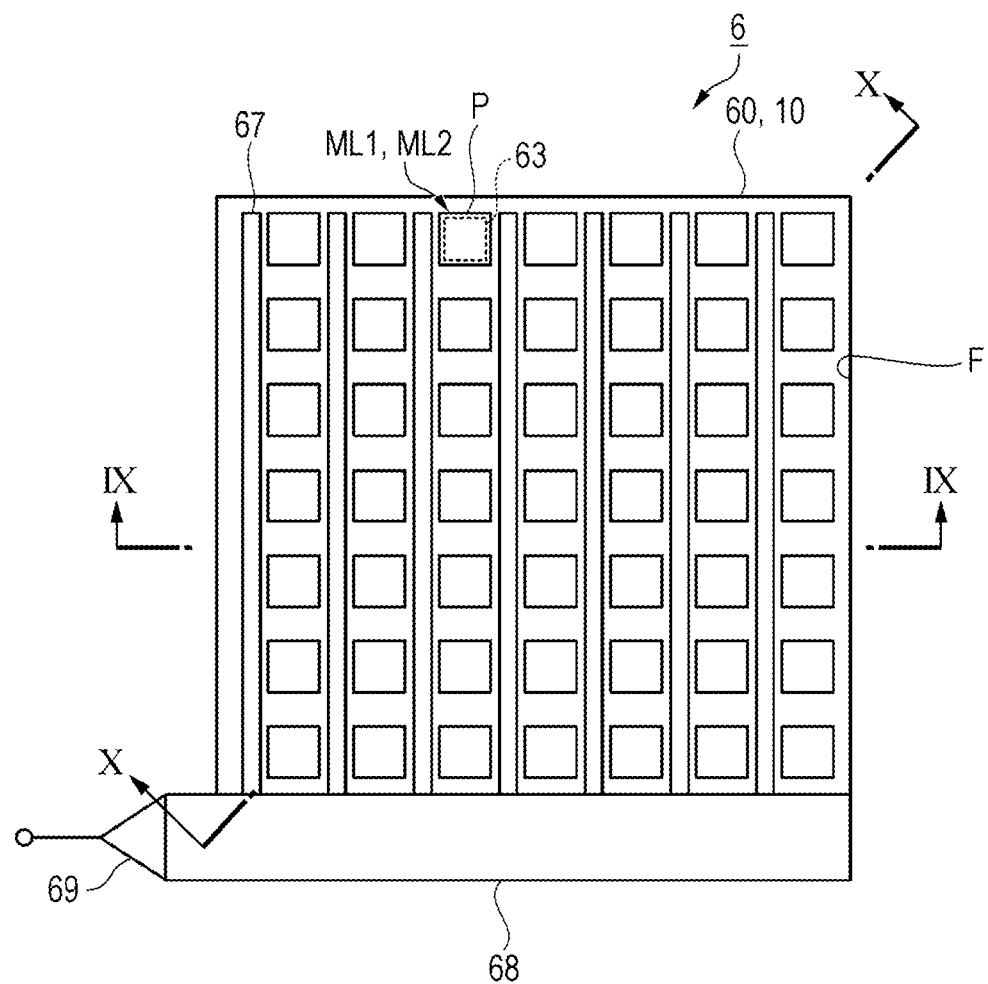
FIG. 8 is a schematic plan view illustrating the configuration of an imaging device that is in accordance with a second embodiment.
Figure 9:
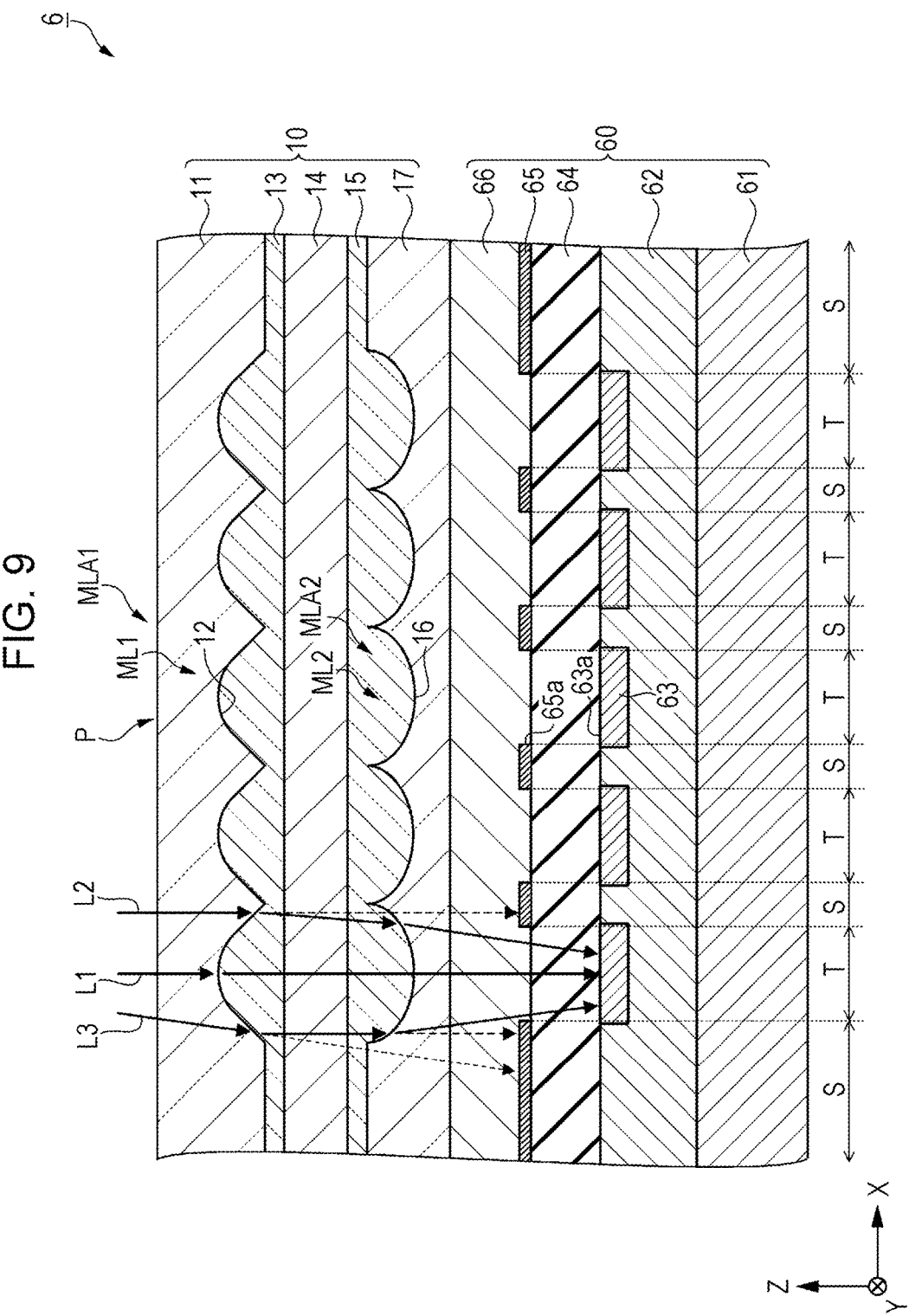
FIG. 9 is a schematic cross-sectional view illustrating the configuration of the imaging device that is in accordance with the second embodiment.
Figure 10:
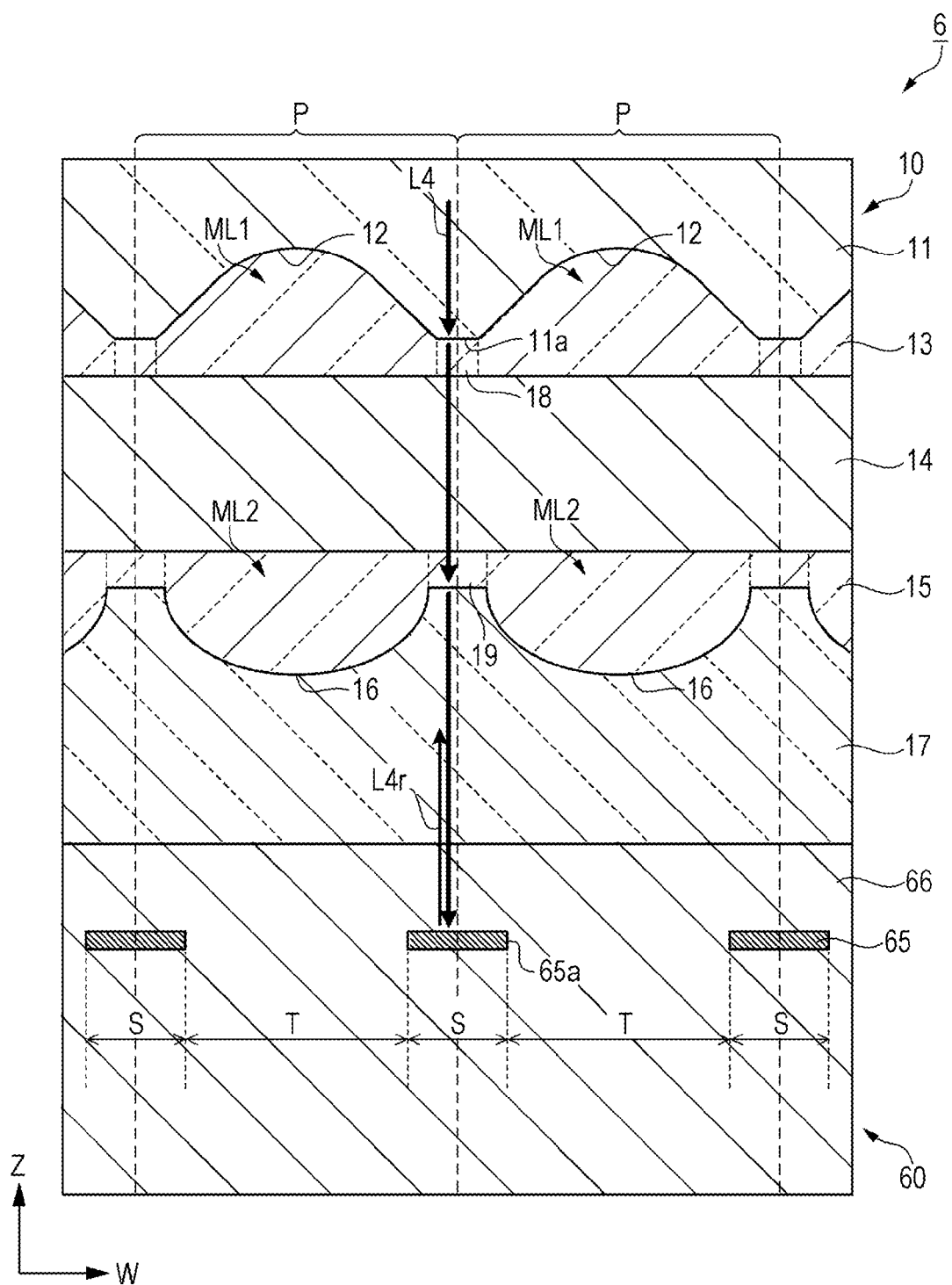
FIG. 10 is a schematic cross-sectional view illustrating the shape and the arrangement of a light-blocking portion and a microlens of the imaging device that is in accordance with the second embodiment.

In a second embodiment, a complementary metal oxide semiconductor (CMOS) imaging device will be described as an example of the optoelectronic device. The imaging device can be suitably used as, for example, an imaging device of a video camera that will be described later. FIG. 8 is a schematic plan view illustrating the configuration of the imaging device that is in accordance with the second embodiment. FIG. 9 is a schematic cross-sectional view illustrating the configuration of the imaging device that is in accordance with the second embodiment. Specifically, FIG. 9 is a schematic cross-sectional view that is taken along the line IX-IX (X direction) in FIG. 8. FIG. 10 is a schematic cross-sectional view illustrating the shape and the arrangement of a light-blocking portion and a microlens of the imaging device that is in accordance with the second embodiment. Specifically, FIG. 10 is a schematic cross-sectional view that is taken along the line X-X (W direction) in FIG. 8. The constituents of the second embodiment that are common to the first embodiment will be given the same reference signs, and descriptions thereof will be omitted.

An imaging device 6 that is in accordance with the second embodiment is provided with a light-receiving element substrate 60 as the first substrate and the microlens array substrate 10 as the second substrate as illustrated in FIG. 8. In the imaging device 6, the microlens array substrate 10 corresponds to the second substrate. The imaging device 6 has a substantially rectangular imaging area F in which the plurality of pixels P is arranged into a shape of a matrix. The imaging device 6 is provided with a vertical drive circuit 67, a horizontal drive circuit 68, and an output circuit 69, all of which are disposed in the light-receiving element substrate 60. The horizontal direction is a direction along the X direction, and the vertical direction is a direction along the Y direction.

The pixel P has a planar shape of a substantial polygon (for example, a substantial rectangle) and is arranged into a shape of a matrix. A light-receiving element 63 and an unillustrated pixel transistor (so-called CMOS transistor) are disposed in each of the plurality of pixels P. In addition, the microlens ML1 and the microlens ML2 that are disposed in the microlens array substrate 10 are arranged in each of the plurality of pixels P to overlap with the light-receiving element 63 in a planar view.

The light-receiving element 63 is configured by a photo-electronic transducer such as a photodiode. The light-receiving element 63 has a light-receiving surface 63a (refer to FIG. 9). The light-receiving element 63 generates signal charges depending on the intensity (strength) of light that is incident on the light-receiving surface 63a through photoelectric conversion and accumulates generated signal charges. The pixel transistor is configured by a plurality of transistors such as a transfer transistor, a reset transistor, and an amplifier transistor.

The vertical drive circuit 67 is disposed along the Y direction for each array of the pixels P that are arranged into a shape of a matrix and are lined up along the Y direction. The vertical drive circuit 67 is configured by, for example, a shift register. The vertical drive circuit 67 transfers signal charges generated by the light-receiving element 63 in the Y direction toward the horizontal drive circuit 68 (−Y direction side of FIG. 8).

The horizontal drive circuit 68 is disposed on one edge (−Y direction side of FIG. 8) of the substantially rectangular imaging device 6 along the X direction. The horizontal drive circuit 68 is configured by, for example, a shift register. The horizontal drive circuit 68 transfers in the X direction signal charges that are transferred by the vertical drive circuit 67.

The output circuit 69 is disposed on the terminal side of the horizontal drive circuit 68. The output circuit 69 is configured by an output amplifier such as a floating diffusion (FD) amplifier. The output circuit 69 converts signal charges transferred by the vertical drive circuit 67 and the horizontal drive circuit 68 into an electrical signal and outputs the electrical signal. The imaging device 6, in addition to these constituents, is provided with a control unit (not illustrated) that generates a control signal and a clock signal which serves as a reference for operation of the vertical drive circuit 67, the horizontal drive circuit 68, and the like.

The light-receiving element substrate 60 is provided with a substrate 61, a semiconductor layer 62, the light-receiving element 63, an interposed insulating layer 64, a light-blocking layer 65, and a flattening layer 66 as illustrated in FIG. 9. In FIG. 9, illustration of the vertical drive circuit 67, the horizontal drive circuit 68, and the output circuit 69 is omitted.

The substrate 61 is a semiconductor substrate that is formed of, for example, silicon. The semiconductor layer 62 is disposed on the substrate 61, and the light-receiving element 63 that is configured by a photodiode and the like is disposed in the semiconductor layer 62. The interposed insulating layer 64 is disposed to cover the semiconductor layer 62 and the light-receiving element 63. The interposed insulating layer 64 is formed of an inorganic material such as $SiO_2$.

The light-blocking layer 65 is disposed into a shape of a lattice on the interposed insulating layer 64 in a planar view. The light-blocking layer 65 is formed of, for example, metal or a metallic compound. The light-blocking layer 65 constitutes the light-blocking portion S, and the area enclosed by the light-blocking layer 65 (inside of an opening portion 65*a*) becomes the opening portion T that transmits light in the area of the pixel P. Disposing the light-blocking layer 65 can suppress light that passes through the microlens ML1 and the microlens ML2 being incident on the light-receiving element 63 of the neighboring pixels P.

The flattening layer 66 is disposed to cover the interposed insulating layer 64 and the light-blocking layer 65 and has a substantially flat surface. The flattening layer 66 may be formed of an inorganic material such as $SiO_2$ or may be formed of a resin material such as an acrylic resin. The microlens array substrate 10 is arranged opposite the flattening layer 66 side of the light-receiving element substrate 60.

The imaging device 6 that is in accordance with the second embodiment is provided with the microlens array substrate 10 that condenses incident light. Thus, in the imaging device 6, not only the ray of light L1 that is incident at the center of the microlens ML1 along the normal direction but also the ray of light L2 that is incident on the end portion of the microlens ML1 along the normal direction and the ray of light L3 that is incident on the end portion of the microlens ML1 in an inclined direction can be refracted toward the center of the opening portion T of the pixel P and pass through the opening portion T. As a result, the efficiency of use of light is improved, and the intensity of light that is incident on the light-receiving element 63 is increased. Thus, light-receiving sensitivity can be improved.

In the imaging device 6, as illustrated in FIG. 10, the ray of light L4 that is incident along the normal direction on the flat portion 18 between the neighboring microlenses ML1 in the W direction is incident on the flat portion 19 between the neighboring microlenses ML2 and travels straight, and the reflective light L4*r* that is reflected by the light-blocking layer 65 travels straight through the flat portion 19 and the flat portion 18 and is emitted outside from the substrate 11. Therefore, stray light caused by total internal reflection of the ray of light L4 that is incident on the end portion of the microlens ML2 can be suppressed. Accordingly, noise caused by stray light is reduced in the signal charges generated by the light-receiving element 63, and thus, the S/N ratio and the resolution of gradations can be improved.

The CMOS imaging device 6 is described as an example of the optoelectronic device in the second embodiment, but the optoelectronic device may be a charge-coupled device (CCD) imaging device.

Third Embodiment

Electronic Apparatus

Figure 11:
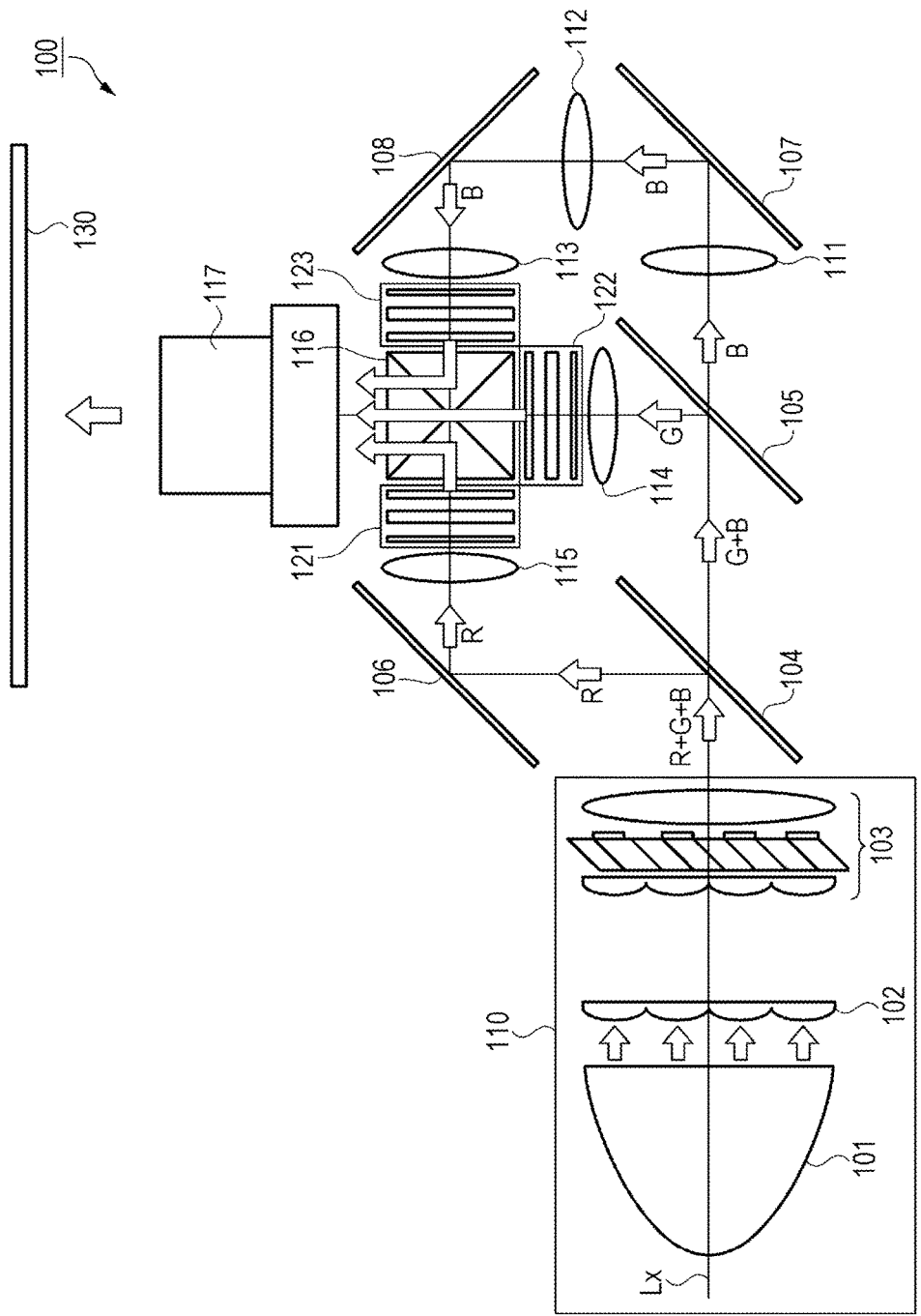
FIG. 11 is a schematic diagram illustrating the configuration of a projector as an electronic apparatus that is in accordance with a third embodiment.

Next, an electronic apparatus that is in accordance with a third embodiment will be described with reference to FIG. 11. FIG. 11 is a schematic diagram illustrating the configuration of a projector as the electronic apparatus that is in accordance with the third embodiment.

A projector (projective display apparatus) 100 as the electronic apparatus that is in accordance with the third embodiment is provided with a polarized light illuminating device 110, two dichroic mirrors 104 and 105, three reflective mirrors 106, 107, and 108, five relay lenses 111, 112, 113, 114, and 115, three liquid crystal light valves 121, 122, and 123, a cross dichroic prism 116, and a projection lens 117 as illustrated in FIG. 11.

The polarized light illuminating device 110 is provided with a ramp unit 101 as a light source that is formed with a white light source such as an ultra-high pressure mercury lamp and a halogen lamp, an integrator lens 102, and a polarization transducer 103. The ramp unit 101, the integrator lens 102, and the polarization transducer 103 are arranged along a system optical axis Lx.

The dichroic mirror 104 reflects red light (R) and transmits green light (G) and blue light (B) among rays of polarized light that are emitted from the polarized light illuminating device 110. The other dichroic mirror 105 transmits blue light (B) and reflects green light (G) that passes through the dichroic mirror 104.

Red light (R) reflected by the dichroic mirror 104 is reflected by the reflective mirror 106 and is incident on the liquid crystal light valve 121 via the relay lens 115. Green light (G) reflected by the dichroic mirror 105 is incident on the liquid crystal light valve 122 via the relay lens 114. Blue light (B) transmitted by the dichroic mirror 105 is incident on the liquid crystal light valve 123 via a light guiding system that is configured by three of the relay lenses 111, 112, and 113, and two of the reflective mirrors 107 and 108.

The transmissive liquid crystal light valves 121, 122, and 123 as an optical modulating element are respectively arranged opposite the incident surfaces of the cross dichroic prism 116 for each color of light. Colors of light that are incident on the liquid crystal light valves 121, 122, and 123 are modulated on the basis of image information (image signal) and are emitted toward the cross dichroic prism 116.

The cross dichroic prism 116 is configured by four attached right angle prisms, and a dielectric multilayer film that reflects red light and a dielectric multilayer film that reflects blue light are formed into a shape of a cross in the inner surfaces of the right angle prisms. These dielectric multilayer films combine three colors of light, and light that represents a color image is combined. The combined light is projected onto a screen 130 by the projection lens 117 that is a projection optical system, and an image is displayed in an enlarged manner.

In the liquid crystal light valve 121, a pair of polarizing elements that is arranged as crossed Nicols are arranged on the incidence side and the emission side of colors of light with an interval therebetween. Another liquid crystal light valves 122 and 123 are configured in the same manner. The liquid crystal light valves 121, 122, and 123 are ones to which the liquid crystal device 1 that is in accordance with the first embodiment is applied.

According to the configuration of the projector 100 that is in accordance with the third embodiment, there can be provided the projector 100 that has a bright display and excellent display quality even when the plurality of pixels P is arranged in high definition because the projector 100 is provided with the liquid crystal device 1 that can obtain a bright display and excellent display quality.

Fourth Embodiment

Electronic Apparatus

Figure 12:
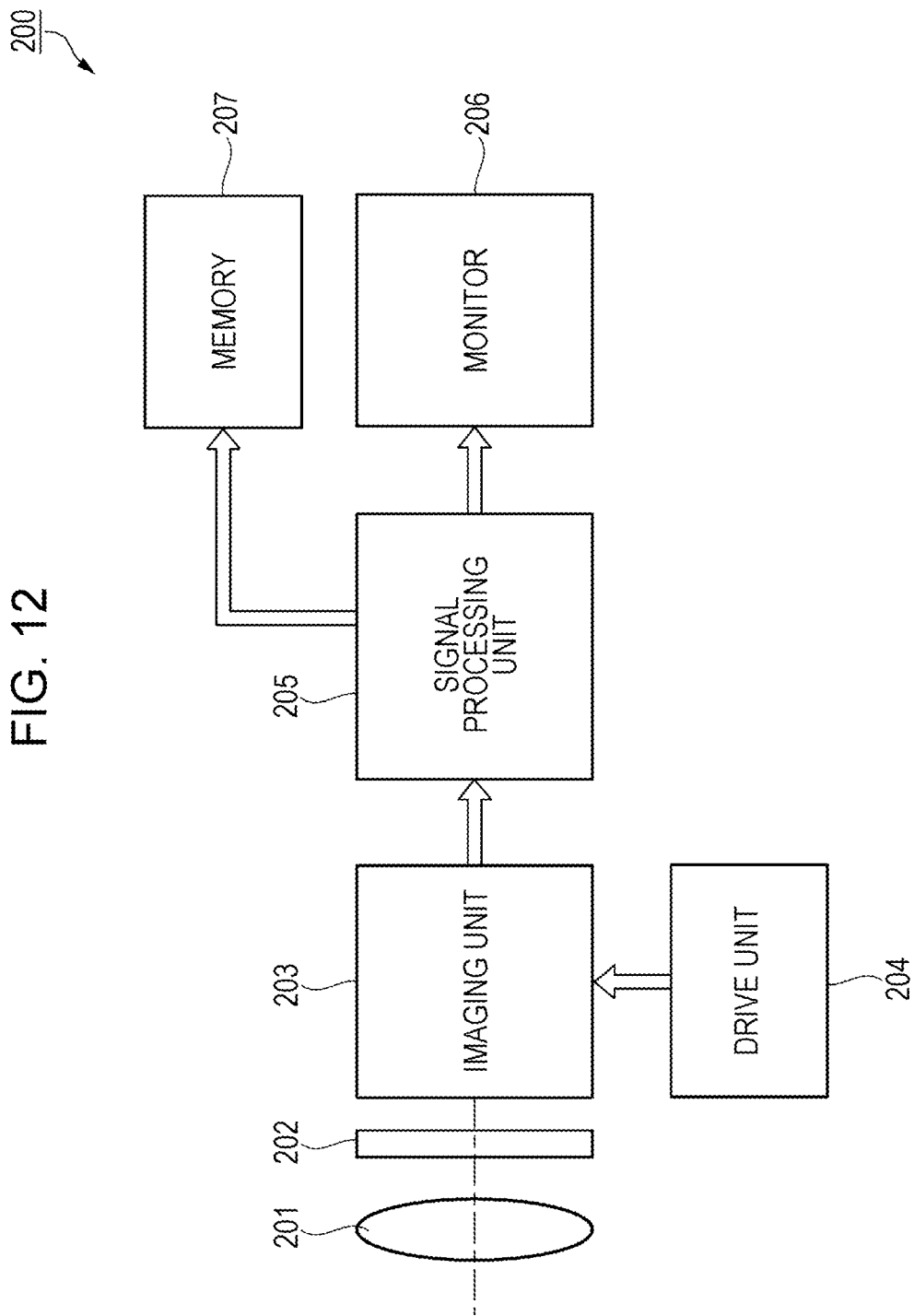
FIG. 12 is a schematic diagram illustrating the configuration of a video camera as an electronic apparatus that is in accordance with a fourth embodiment.

Next, an electronic apparatus that is in accordance with a fourth embodiment will be described with reference to FIG. 12. FIG. 12 is a schematic diagram illustrating the configuration of a video camera as the electronic apparatus that is in accordance with the fourth embodiment. A video camera 200 that is in accordance with the fourth embodiment is an electronic apparatus that can image a still image and moving images.

The video camera 200 as the electronic apparatus that is in accordance with the fourth embodiment is provided with an optical unit 201, a shutter unit 202, an imaging unit 203, a drive unit 204, a signal processing unit 205, a monitor 206, and a memory 207 as illustrated in FIG. 12. The imaging unit 203 is one to which the imaging device 6 that is in accordance with the second embodiment is applied. The monitor 206 is one to which the liquid crystal device 1 that is in accordance with the first embodiment is applied.

The optical unit 201 is configured by one or a plurality of lenses. The optical unit 201 guides light (incident light) from a subject to the imaging unit 203 and forms an image from light on the light-receiving surface 63a (refer to FIG. 9) of the light-receiving element 63 of the imaging unit 203. The shutter unit 202 is arranged between the optical unit 201 and the imaging unit 203 and controls a light irradiation period and a light blocking period for the imaging unit 203 under control of the drive unit 204.

The imaging unit 203 accumulates signal charges for a certain period in response to the image that is formed on the light-receiving surface 63a from light traveling through the optical unit 201 and the shutter unit 202. Signal charges accumulated by the imaging unit 203 are transferred according to a drive signal (timing signal) that is supplied from the drive unit 204. The imaging unit 203 may be included as a part in a module that is configured with the optical unit 201 or the signal processing unit 205.

The drive unit 204 drives the imaging unit 203 and the shutter unit 202 by outputting the drive signal that controls transfer operation of the imaging unit 203 and shutter operation of the shutter unit 202. The signal processing unit 205 performs various types of signal processing for signal charges that are output from the imaging unit 203. An image (image data) that is obtained through the signal processing by the signal processing unit 205 is supplied to the monitor 206 to be displayed and is supplied to the memory 207 to be stored (recorded).

According to the configuration of the video camera 200 that is in accordance with the fourth embodiment, there can be provided the video camera 200 that can image a bright image in an excellent resolution because the video camera 200 is provided with the imaging device 6 that is intended to improve light-receiving sensitivity and to increase the S/N ratio and the resolution of gradations. The signal processing performed by the signal processing unit 205 can be simplified by increasing the S/N ratio and the resolution of gradations. Thus, the speed of the signal processing can be increased, and the cost for manufacturing the signal processing unit 205 can be decreased. In addition, there can be provided the video camera 200 that can display a bright image with excellent display quality on the monitor 206 because the video camera 200 is provided with the liquid crystal device 1 that can obtain a bright display and excellent display quality.

The embodiments described above are merely intended to be illustrative of an aspect of the invention. The embodiments can be arbitrarily modified and applied within the extent of the invention. For example, modification examples are considered as follows.

First Modification Example

Figure 13:
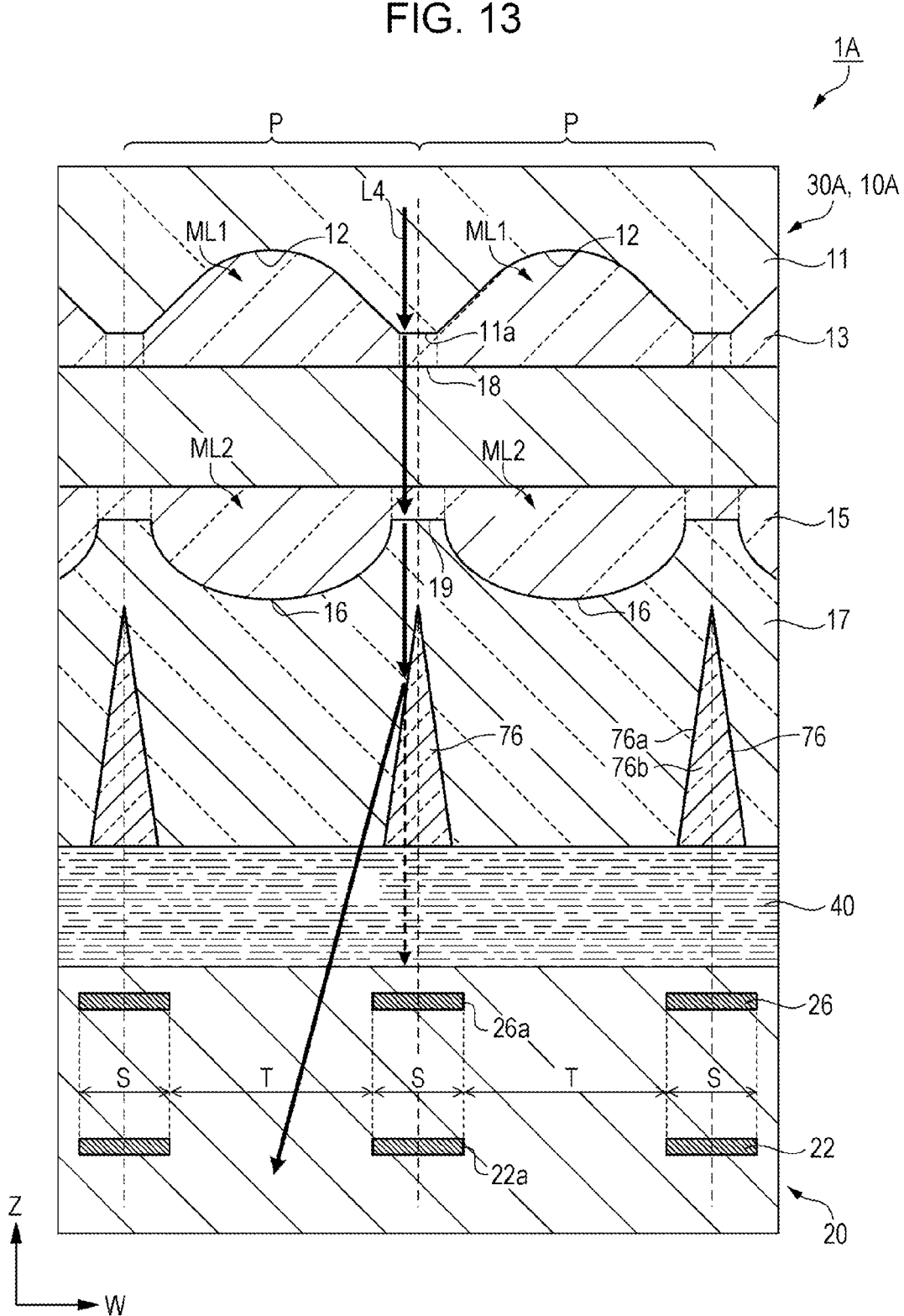
FIG. 13 is a schematic cross-sectional view illustrating the shape and the arrangement of a light-blocking portion and a microlens of a liquid crystal device that is in accordance with a first modification example.

In the configuration of the liquid crystal device 1 that is in accordance with the first embodiment, the ray of light L4 that is incident on the flat portion 18 along the normal direction is incident on the flat portion 19 and is blocked by the light-blocking layer 26 (refer to FIG. 5). However, the invention is not limited to such an embodiment. For example, there may be provided a configuration that includes a prism in the area which overlaps with the flat portion 18 and the flat portion 19 in a planar view to reflect the ray of light L4. FIG. 13 is a schematic cross-sectional view illustrating the shape and the arrangement of a light-blocking portion and a microlens of a liquid crystal device that is in accordance with a first modification example. Specifically, FIG. 13 corresponds to a schematic cross-sectional view that is taken along the line V-V in FIG. 4 in the same manner as FIG. 5. The constituents of the first modification example that are common to the above embodiments will be given the same reference signs, and descriptions thereof will be omitted.

A liquid crystal device 1A that is in accordance with the first modification example is provided with a microlens array substrate 10A in an opposite substrate 30A as illustrated in FIG. 13. The microlens array substrate 10A is provided with a prism 76 that is further toward the liquid crystal layer 40 than the microlens ML2 in the area that overlaps with the flat portion 18 and the flat portion 19 in a planar view. The prism 76 is disposed into a shape of a lattice along the X direction and the Y direction to overlap with the light-blocking portion S (light-blocking layer 26) in a planer view, but FIG. 13 illustrates the cross section of the intersecting part of a part of the prism 76 along the X direction and a part of the prism 76 along the Y direction.

The prism 76 is configured as a groove that is formed to be opened toward the liquid crystal layer 40 and has a shape of a substantial isosceles triangle with V-shaped two inclined surfaces 76a as two edges of the triangle in a cross-sectional view. The inside of the prism 76 is a hollow portion 76b that is in a state close to a vacuum by sealing the base edges of the groove having a shape of a substantial isosceles triangle. The prism 76 may be disposed by forming a groove in the flattening layer 17 or may be disposed by stacking another layer or a substrate on the liquid crystal layer 40 side of the flattening layer 17 and forming a groove in the layer or the substrate.

In the liquid crystal device 1A that is in accordance with the first modification example, the ray of light L4 that passes through the flat portion 18 and the flat portion 19 and travels toward the light-blocking portion S (light-blocking layer 26) is reflected by the inclined surface 76a of the prism 76 and is guided into the opening portion T of the pixel P. As such, in the liquid crystal device 1A, the ray of light L4 that is to be blocked by the light-blocking portion S (light-blocking layer 26) can be guided into the opening portion T by the prism 76. Thus, the efficiency of use of incident light can be further improved while stray light is suppressed when compared with the liquid crystal device 1 that is in accordance with the first embodiment.

The width of the prism 76 is preferably greater than the size of the part that overlaps with the flat portion 18 and the flat portion 19 in a planar view. In such a configuration, the ray of light L4 that passes through the flat portion 18 and the flat portion 19 and travels toward the light-blocking portion S (light-blocking layer 26) can be reflected by the prism 76 to a greater degree and can be guided into the opening portion T. The microlens array substrate 10A that is in accordance with the first modification example can be applied to the imaging device 6 that is in accordance with the second embodiment. In this case, the same effect can be achieved.

Second Modification Example

Figure 14:
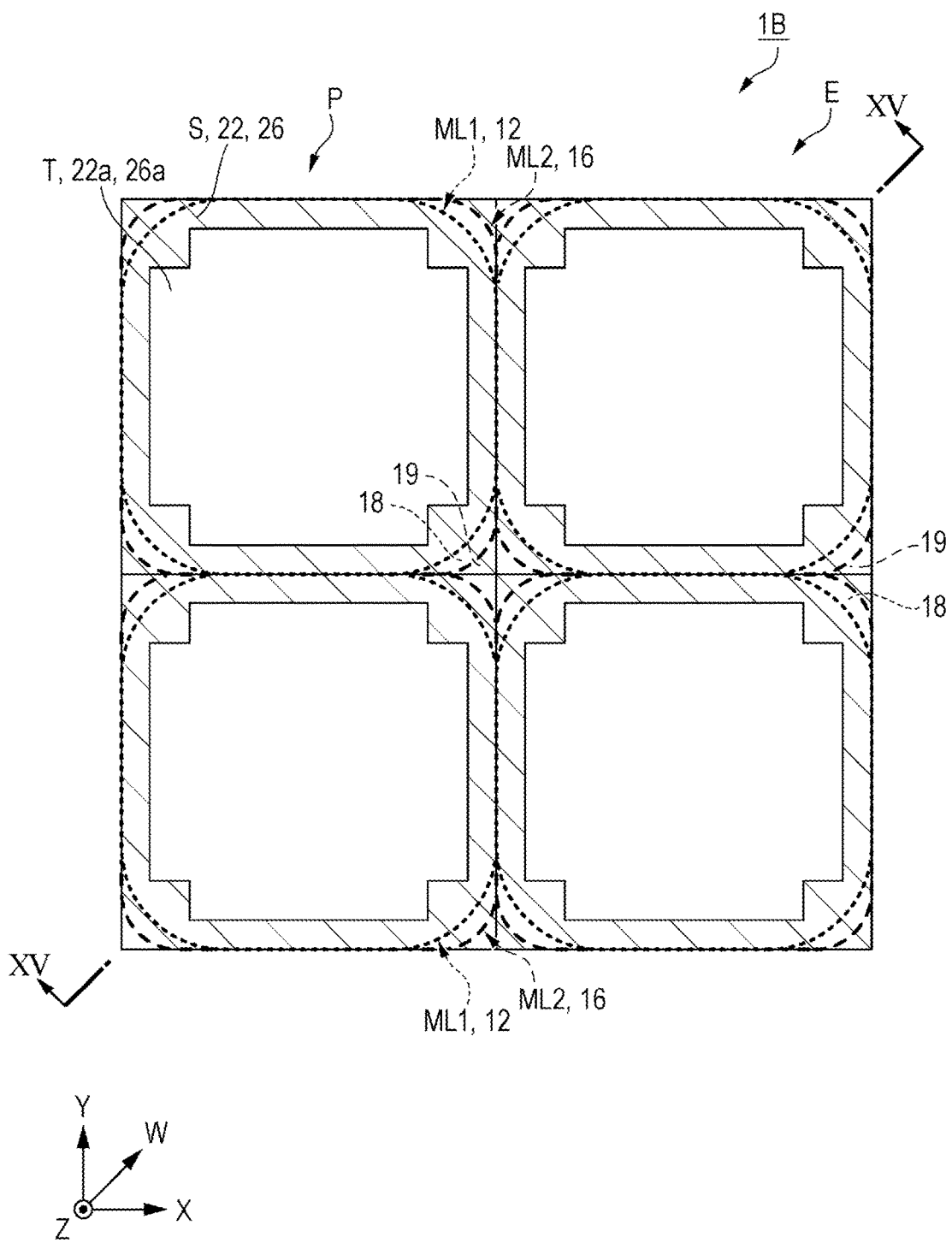
FIG. 14 is a schematic plan view illustrating the shape and the arrangement of a light-blocking portion and a microlens of a liquid crystal device that is in accordance with a second modification example.

In the configuration of the liquid crystal device 1 that is in accordance with the first embodiment, the extent of the flat portion 19 is greater than the extent of the flat portion 18. However, the invention is not limited to such an embodiment. For example, there may be provided a configuration in which the extent of the flat portion 19 is less than the extent of the flat portion 18. FIG. 14 is a schematic plan view illustrating the shape and the arrangement of a light-blocking portion and a microlens of a liquid crystal device that is in accordance with a second modification example. The constituents of the second modification example that are common to the above embodiments will be given the same reference signs, and descriptions thereof will be omitted.

In a liquid crystal device 1B that is in accordance with the second modification example, the diameter of the microlens ML2 (convex portion 16) is greater than the diameter of the microlens ML1 (concave portion 12) in a direction along a diagonal (W direction), and the extent of the flat portion 19 is less than the extent of the flat portion 18 as illustrated in FIG. 14. Such a configuration can also reduce the intensity of light that passes through the flat portion 18 and is incident on the end portion of the microlens ML2. This can suppress stray light that is caused by total internal reflection of light which is incident on the end portion of the microlens ML2. However, the extent of the flat portion 19 is preferably greater than the extent of the flat portion 18 because stray light can be suppressed more effectively in this case.

Third Modification Example

Figure 15:
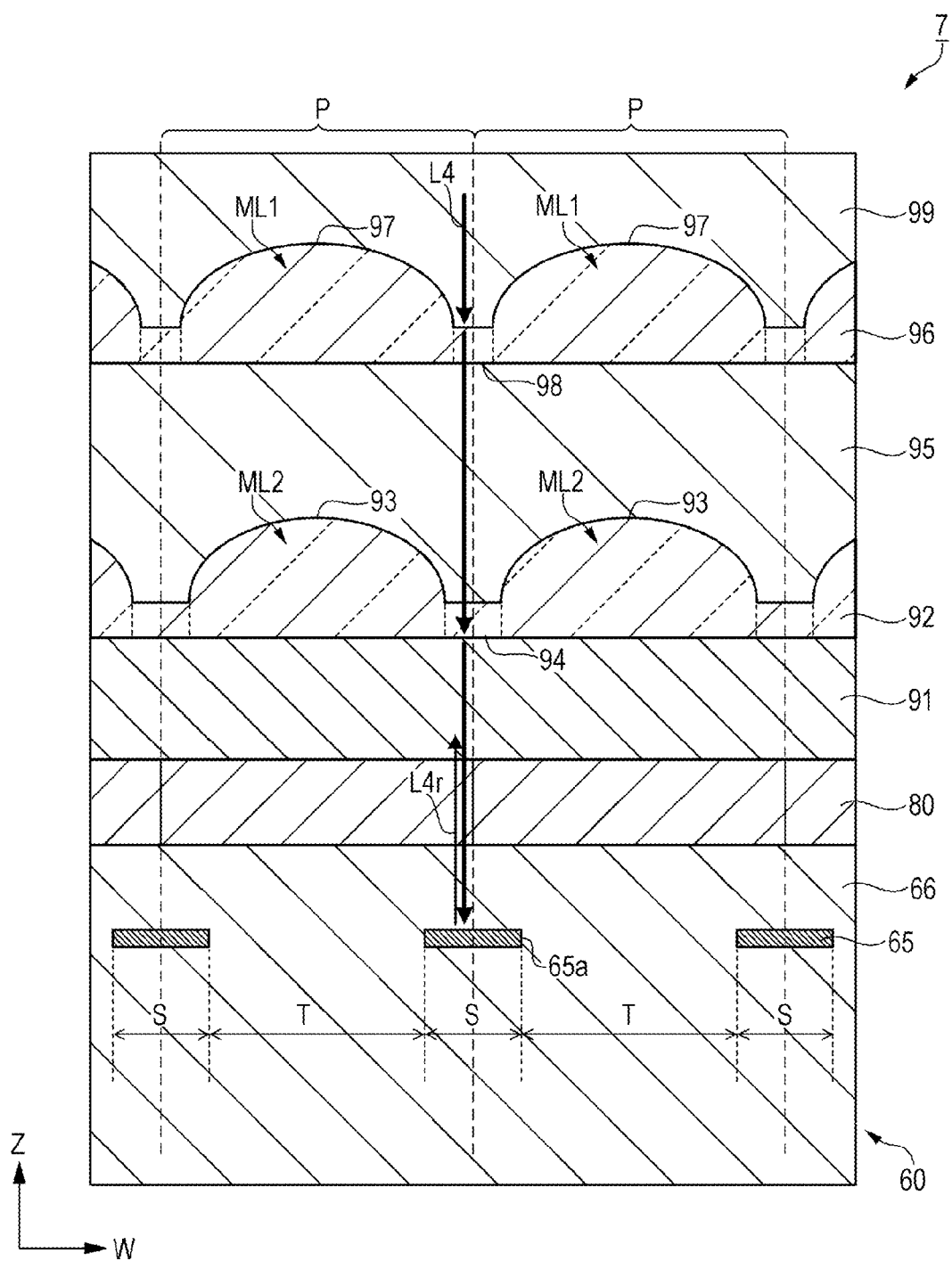
FIG. 15 is a schematic cross-sectional view illustrating the shape and the arrangement of a light-blocking portion and a microlens of an imaging device that is in accordance with a third modification example.

The imaging device 6 that is in accordance with the second embodiment is configured to be provided with the light-receiving element substrate 60 and the microlens array substrate 10. However, the invention is not limited to such an embodiment. For example, there may be provided a configuration in which the microlens ML1 and the microlens ML2 are disposed on a light-receiving element substrate. FIG. 15 is a schematic cross-sectional view illustrating the shape and the arrangement of a light-blocking portion and a microlens of an imaging device that is in accordance with a third modification example. FIG. 15 corresponds to a schematic cross-sectional view that is taken along the line X-X in FIG. 8 in the same manner as FIG. 10. The constituents of the third modification example that are common to the above embodiments will be given the same reference signs, and descriptions thereof will be omitted.

In an imaging device 7 that is in accordance with the third modification example, the microlens ML1 and the microlens ML2 that are constituents of the microlens array substrate 10 are disposed on the light-receiving element substrate 60 as illustrated in FIG. 15. More specifically, the imaging device 7 is provided with a color filter layer 80, a flattening layer 91, a lens layer 92 having a convex portion 93, a flattening layer 95, a lens layer 96 having a convex portion 97, and a flattening layer 99 on the light-receiving element substrate 60 (flattening layer 66). The color filter layer 80 includes color filters for different colors such as red, green, and blue. Any color of the color filter is arranged in each pixel P. The flattening layer 91, the lens layer 92, the flattening layer 95, the lens layer 96, and the flattening layer 99 may be formed of an inorganic material or may be formed of a resin material.

The lens layer 92 has a higher light refractive index than the flattening layer 95. The convex microlens ML2 as the second microlens is configured by covering the convex portion 93 with the flattening layer 95. The lens layer 96 has a higher light refractive index than the flattening layer 99. The convex microlens ML1 as the first microlens is configured by covering the convex portion 97 with the flattening layer 99. The lens layer 92 having the convex portion 93 and the lens layer 96 having the convex portion 97 can be formed on the light-receiving element substrate 60 in the same manner as the lens layer 15 having the convex portion 16 in the first embodiment.

In the imaging device 7, a flat portion 98 as the first flat portion is disposed between the neighboring microlenses ML1 (convex portions 97) in the diagonal direction (W direction), and a flat portion 94 as the second flat portion is disposed between the neighboring microlenses ML2 (convex portions 93). The flat portion 98 and the flat portion 94 are arranged to overlap with each other in the area that overlaps with the light-blocking portion S in a planar view. The extent of the flat portion 94 is preferably greater than the extent of the flat portion 98. Even with the configuration of the imaging device 7 that is in accordance with the third modification example, the same effect can be achieved as that of the imaging device 6 that is in accordance with the second embodiment.

The imaging device 7 can image a color image since the imaging device 7 is provided with the color filter layer 80. Mixed color may be caused between the pixels P when stray light occurs in the imaging device 7. However, since stray light is suppressed in the same manner as the imaging device 6, the imaging device 7 can suppress mixed color and image an image with excellent color reproducibility. The color filter layer 80 may be disposed between the flattening layer 95 and the lens layer 96.

Fourth Modification Example

In the liquid crystal device 1 and the imaging device 6 that are in accordance with the above embodiments, the microlens ML1 and the microlens ML2 are configured to have a planar shape of a substantial rectangle. However, the invention is not limited to such an embodiment. Although not illustrated, for example, the planar shape of the pixel P, the microlens ML1 and the microlens ML2 may be a shape other than a rectangle such as a hexagon. In addition, the pixel P, the microlens ML1, and the microlens ML2 may be arranged into a shape of a honeycomb, not a shape of a matrix when the planar shape thereof is a hexagon. Even when the planar shape of the pixel P, the microlens ML1, and the microlens ML2 is a shape other than a rectangle, the same effect can be achieved as that of the above embodiments provided that the flat portion between the microlenses ML1 that neighbor each other at a vertex and the flat portion between the microlenses ML2 that neighbor each other at a vertex are arranged to overlap with each other in a planar view.

Fifth Modification Example

The electronic apparatus to which the liquid crystal device 1 that is in accordance with the first embodiment can be applied is not limited to the projector 100 and the video camera 200. The liquid crystal device 1 can be suitably used as a display unit of information terminal devices such as a projective head-up display (HUD), a direct view head-mounted display (HMD), an electronic book, a personal computer, a digital still camera, a liquid crystal television, a viewfinder-type video camera, a car navigation system, an electronic organizer, and a POS.

The electronic apparatus to which the imaging device 6 that is in accordance with the second embodiment can be applied is not limited to the video camera 200. The imaging device 6 can be suitably used as an imaging unit of information terminal devices such as a digital still camera and a cellular phone having an imaging function.

The entire disclosure of Japanese Patent Application No. 2014-109852, filed May 28, 2014 is expressly incorporated by reference herein.

What is claimed is:

1. A lens array substrate comprising:
a substrate;
a plurality of first lenses that is disposed on a first face of the substrate, each first lens having a planar shape of a substantial polygon;
a first light-transmissive layer that is disposed to cover the plurality of first lenses;
a plurality of second lenses that is disposed on the first light-transmissive layer, each second lens having a planar shape of a substantial polygon; and
a second light-transmissive layer that is disposed to cover the plurality of second lenses,
wherein
two lenses among the plurality of first lenses are connected to each other, the two lenses neighboring each other with an edge of the substantial polygon interposed therebetween,
each of the plurality of first lenses overlaps with one corresponding lens among the plurality of second lenses,
a first flat portion is disposed between two lenses among the plurality of first lenses, the two lenses neighboring each other with a vertex of the substantial polygon interposed therebetween,
a second flat portion is disposed between two lenses among the plurality of second lenses, the two lenses neighboring each other with a vertex of the substantial polygon interposed therebetween,
the first flat portion is configured by a flat surface of the first face of the substrate,
the second flat portion is configured by a flat surface of the second light-transmissive layer that is substantially parallel to the first face of the substrate,
the first flat portion and the second flat portion are arranged in order for at least a part of the first flat portion and a part of the second flat portion to overlap with each other in a planar view, and
the extent of the second flat portion is greater than the extent of the first flat portion.

2. The lens array substrate according to claim 1,
wherein the angle between an inclined surface of an end portion of one lens among the plurality of first lenses and the first face of the substrate is less than the angle between an inclined surface of an end portion of one lens among the plurality of second lenses and the first face of the substrate.

3. An optoelectronic device comprising:
an element substrate that includes a switching element which is disposed in each of a plurality of pixels and a light-blocking portion which has an opening portion corresponding to each of the plurality of pixels and is disposed to overlap with the switching element in a planar view;
the lens array substrate according to claim 2 is arranged opposite the element substrate; and
an optoelectronic layer that is arranged between the element substrate and the lens array substrate,
wherein each of the plurality of first lenses and each of the plurality of second lenses are arranged to overlap with the corresponding opening portion in a planar view, and
the first flat portion and the second flat portion are arranged to overlap with the light-blocking portion in a planar view.

4. An optoelectronic device comprising:
an element substrate that includes a light-receiving element which is disposed in each of a plurality of pixels and a light-blocking portion which includes an opening portion corresponding to each of the plurality of pixels; and
the lens array substrate according to claim 2 is arranged opposite the element substrate,
wherein each of the plurality of first lenses and each of the plurality of second lenses are arranged to overlap with the corresponding light-receiving element and the corresponding opening portion in a planar view, and
the first flat portion and the second flat portion are arranged to overlap with the light-blocking portion in a planar view.

5. The lens array substrate according to claim 1, further comprising:
a prism that is arranged on the opposite side of the plurality of second lenses from the substrate to overlap with the first flat portion and the second flat portion in a planar view.

6. The lens array substrate according to claim 5,
wherein the width of the prism in a first direction that is along the first face of the substrate is greater than the width of an overlapping part between the first flat portion and the second flat portion in a planar view in the first direction.

7. An optoelectronic device comprising:

an element substrate that includes a switching element which is disposed in each of a plurality of pixels and a light-blocking portion which has an opening portion corresponding to each of the plurality of pixels and is disposed to overlap with the switching element in a planar view;

the lens array substrate according to claim 5 is arranged opposite the element substrate; and an optoelectronic layer that is arranged between the element substrate and the lens array substrate, wherein each of the plurality of first lenses and each of the plurality of second lenses are arranged to overlap with the corresponding opening portion in a planar view, and the first flat portion and the second flat portion are arranged to overlap with the light-blocking portion in a planar view.

8. An optoelectronic device comprising:

an element substrate that includes a switching element which is disposed in each of a plurality of pixels and a light-blocking portion which has an opening portion corresponding to each of the plurality of pixels and is disposed to overlap with the switching element in a planar view;

the lens array substrate according to claim 6 is arranged opposite the element substrate; and an optoelectronic layer that is arranged between the element substrate and the lens array substrate, wherein each of the plurality of first lenses and each of the plurality of second lenses are arranged to overlap with the corresponding opening portion in a planar view, and the first flat portion and the second flat portion are arranged to overlap with the light-blocking portion in a planar view.

9. The lens array substrate according to claim 1, wherein the plurality of first lenses is configured by a first lens layer that is arranged to fill a plurality of concave portions disposed on the first face of the substrate and has a different refractive index from the substrate, and the plurality of second lenses is configured by a second lens layer that is arranged on the first light-transmissive layer, has a plurality of convex portions, and has a different refractive index from the second light-transmissive layer.

10. An optoelectronic device comprising:

an element substrate that includes a switching element which is disposed in each of a plurality of pixels and a light-blocking portion which has an opening portion corresponding to each of the plurality of pixels and is disposed to overlap with the switching element in a planar view;

the lens array substrate according to claim 9 is arranged opposite the element substrate; and an optoelectronic layer that is arranged between the element substrate and the lens array substrate, wherein each of the plurality of first lenses and each of the plurality of second lenses are arranged to overlap with the corresponding opening portion in a planar view, and the first flat portion and the second flat portion are arranged to overlap with the light-blocking portion in a planar view.

11. An optoelectronic device comprising:

an element substrate that includes a switching element which is disposed in each of a plurality of pixels and a light-blocking portion which has an opening portion corresponding to each of the plurality of pixels and is disposed to overlap with the switching element in a planar view;

the lens array substrate according to claim 1 is arranged opposite the element substrate; and an optoelectronic layer that is arranged between the element substrate and the lens array substrate, wherein each of the plurality of first lenses and each of the plurality of second lenses are arranged to overlap with the corresponding opening portion in a planar view, and the first flat portion and the second flat portion are arranged to overlap with the light-blocking portion in a planar view.

12. An electronic apparatus comprising:

the optoelectronic device according to claim 11.

13. An optoelectronic device comprising:

an element substrate that includes a light-receiving element which is disposed in each of a plurality of pixels and a light-blocking portion which includes an opening portion corresponding to each of the plurality of pixels; and the lens array substrate according to claim 1 is arranged opposite the element substrate, wherein each of the plurality of first lenses and each of the plurality of second lenses are arranged to overlap with the corresponding light-receiving element and the corresponding opening portion in a planar view, and the first flat portion and the second flat portion are arranged to overlap with the light-blocking portion in a planar view.

* * * * *